United States Patent
Panchal et al.

(10) Patent No.: US 7,518,830 B1
(45) Date of Patent: Apr. 14, 2009

(54) DUAL SIDED ELECTRICAL TRACES FOR DISK DRIVE SUSPENSION FLEXURES

(75) Inventors: Paritosh C. Panchal, Hutchinson, MN (US); Ryan D. Kariniemi, Cokato, MN (US); Reed T. Hentges, Buffalo, MN (US); Ramesh K. Dandu, Hutchinson, MN (US); Mark M. Kiviahde, Buffalo, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 344 days.

(21) Appl. No.: 11/406,828

(22) Filed: Apr. 19, 2006

(51) Int. Cl.
  *G11B 5/58* (2006.01)
(52) U.S. Cl. .................................. 360/245.8
(58) Field of Classification Search ............. 360/245.8, 360/245.9, 246, 245.3
  See application file for complete search history.

(56) References Cited

U.S. PATENT DOCUMENTS

| | | | |
|---|---|---|---|
| 5,666,717 A | 9/1997 | Matsumoto et al. | |
| 5,694,270 A | 12/1997 | Sone et al. | |
| 5,754,369 A | 5/1998 | Balakrishnan | |
| 5,764,444 A | 6/1998 | Imamura et al. | |
| 5,862,010 A | 1/1999 | Simmons et al. | |
| 5,995,328 A * | 11/1999 | Balakrishnan | 360/245.9 |
| 6,172,854 B1 | 1/2001 | Iwamoto | |
| 6,501,623 B1 | 12/2002 | Sassolini et al. | |
| 6,576,148 B1 * | 6/2003 | Shum et al. | 216/13 |
| 6,735,049 B1 | 5/2004 | Lauer | |
| 6,735,052 B2 * | 5/2004 | Dunn et al. | 360/245.9 |
| 6,841,737 B2 | 1/2005 | Komatsubara et al. | |
| 6,940,697 B2 * | 9/2005 | Jang et al. | 360/264.2 |
| 7,019,946 B2 | 3/2006 | Budde et al. | |
| 7,046,483 B2 | 5/2006 | Erpelding | |
| 2003/0026078 A1 | 2/2003 | Komatsubara et al. | |
| 2003/0206376 A1 | 11/2003 | Erpelding et al. | |
| 2003/0227718 A1 | 12/2003 | Ishikawa | |
| 2004/0047078 A1 | 3/2004 | Budde et al. | |

FOREIGN PATENT DOCUMENTS

| | | |
|---|---|---|
| EP | 0549814 A1 | 7/1992 |
| JP | 11053854 A | 2/1999 |
| JP | 11213365 A | 6/1999 |
| JP | 2002216327 A | 8/2002 |
| JP | 2003162804 A | 6/2003 |
| JP | 2007157209 | 6/2007 |
| WO | 9302451 A1 | 2/1993 |
| WO | 9820485 A1 | 5/1998 |
| WO | 0030081 A1 | 5/2000 |
| WO | 0175882 A1 | 10/2001 |

\* cited by examiner

*Primary Examiner*—Jefferson Evans
(74) *Attorney, Agent, or Firm*—Faegre & Benson LLP

(57) ABSTRACT

A flexure for attachment to a load beam in an integrated lead disk drive suspension assembly. The flexure includes a spring metal layer having slider mounting region, a first surface and a second surface opposing the first surface. A first group of conductive leads extends along at least a portion of the first surface and is separated from the spring metal layer by a first dielectric layer. A second group of conductive leads extends along at least a portion of the second surface and is separated from the spring metal layer by a second dielectric layer. A conductive interconnection extends between a conductive lead from the first group of conductive leads and a conductive lead from the second group of conductive leads. One or more leads from each of the first and second groups of conductive leads can be attached to a magnetic head.

15 Claims, 23 Drawing Sheets

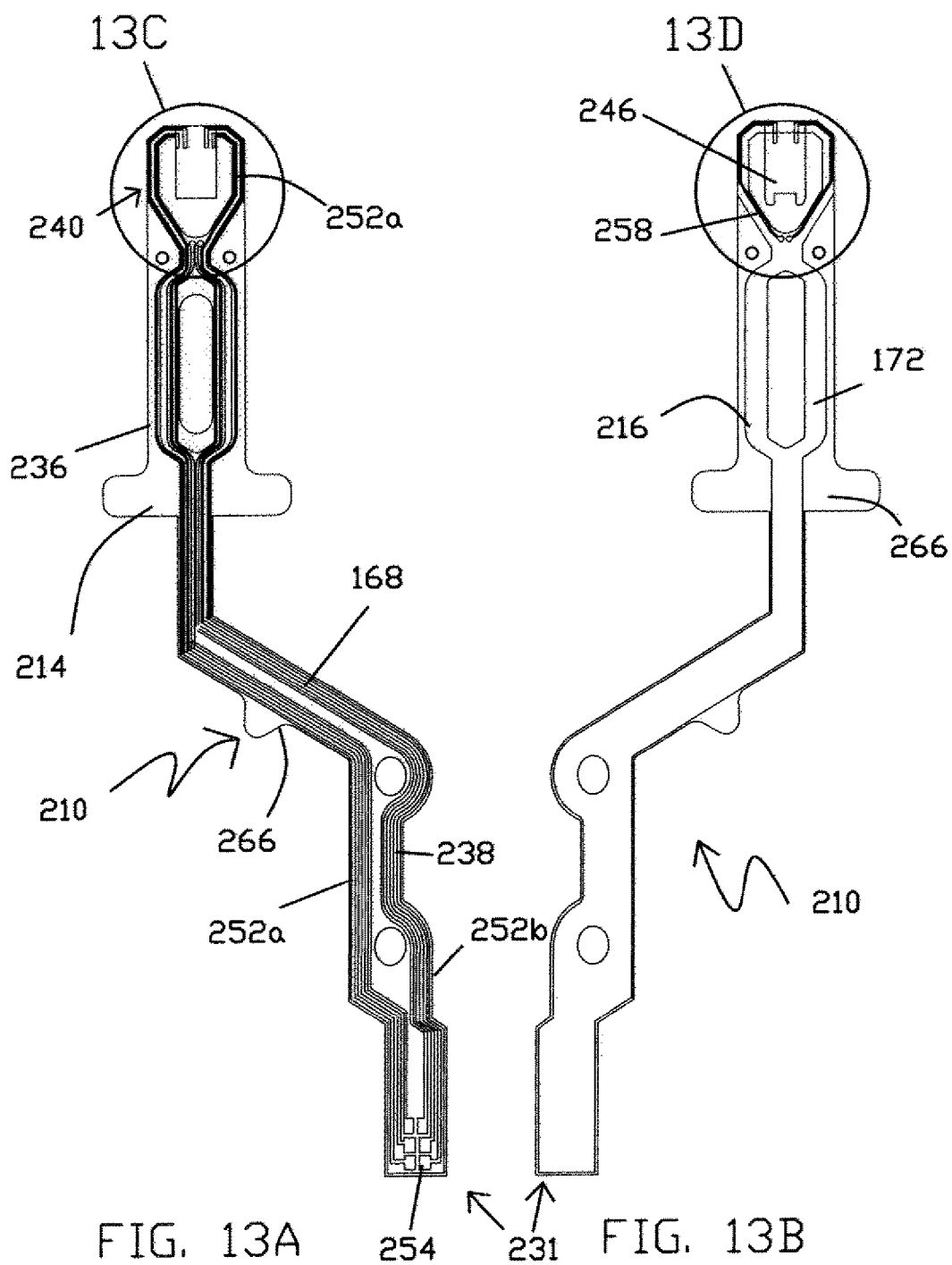

US 7,518,830 B1

DUAL SIDED ELECTRICAL TRACES FOR DISK DRIVE SUSPENSION FLEXURES

FIELD OF THE INVENTION

The present invention relates generally to the field of integrated lead or wireless head suspensions for disk drives. More particularly, the invention is a flexure having electrical traces on both opposing major surfaces.

BACKGROUND OF THE INVENTION

Integrated lead or wireless disk drive suspensions having flexures with conductive leads or traces are known. The traces provide electrical communication between external control circuitry and electrical components such as a magnetic head, which are attached to the suspension assembly in a gimbal region. Technological advances require smaller and narrower suspension assemblies. At the same time, suspension assemblies can require an increasing number of conductive leads. For example, suspensions can include microactuators, sensors, or other components requiring additional conductive traces. In some instances, these additional traces necessarily extend into the gimbal region of the flexure. With the ever decreasing size requirements for suspension assemblies along with the competing requirement of additional conductors, the need exists for flexures that can meet these requirements.

SUMMARY OF THE INVENTION

The invention is a flexure having conductive leads or traces on each of two opposing major surfaces. The flexure can be attached to a load beam in an integrated lead disk drive suspension assembly. The invention can also include an electrical interconnection between a conductive lead on one of the major surfaces to a conductive lead on the opposing major surface. The electrical interconnection is formed through an aperture that extends through the flexure. One or more conductive leads is electrically connected to the magnetic head. The load beam can include a channel in which conductive leads on one of the flexure surfaces are positioned when the flexure is attached to the load beam. Conductive leads on the flexure can be connected to other devices such as sensors and microactuators.

BRIEF DESCRIPTION OF THE DRAWINGS

FIGS. 13A-B are plan views of the opposing surfaces of a flexure having conductive leads extending along a portion of each the top and bottom surfaces of the flexure in accordance with another embodiment of the invention.

DETAILED DESCRIPTION OF THE PREFERRED EMBODIMENTS

Figure 1:
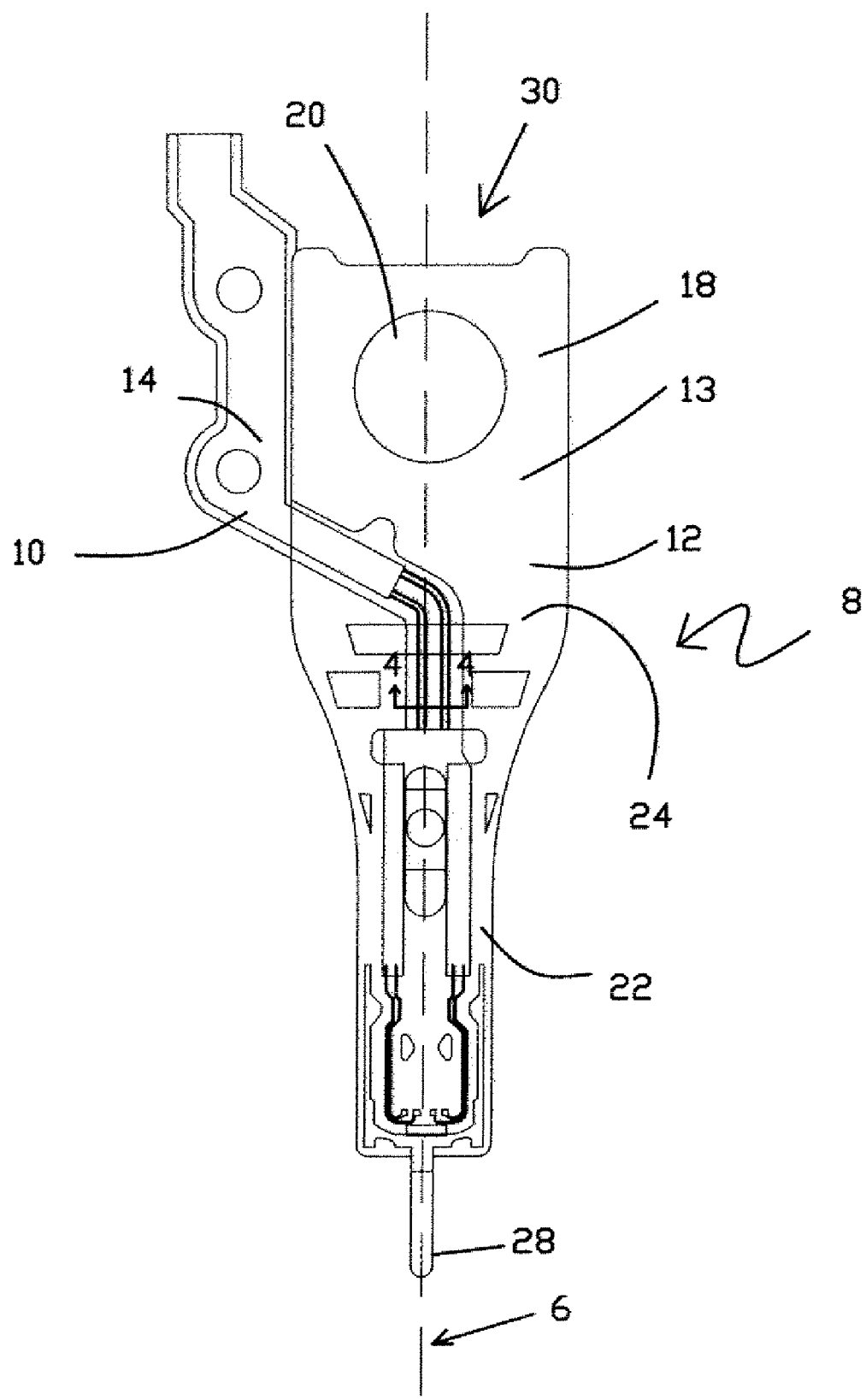
FIG. 1 is a plan view of an integrated lead suspension assembly having a flexure attached to a load beam, and having conductive traces on two opposing surfaces according to one embodiment of the invention.

FIGS. 1 and 2A-C illustrate an integrated lead disk drive suspension assembly 8 including a load beam 12 and a flexure 10 in accordance with one embodiment of the invention. Flexure 10 has electrical traces or leads extending along each of a first major surface 14 and a second major surface 16. Load beam 12 is formed from a spring metal such as stainless steel and includes an actuator arm mounting region 18 located at a proximal end 30 of the load beam. The actuator arm mounting region 18 includes an aperture 20 for accepting, and being mounted to, the actuator arm (not shown).

Load beam 12 includes a rigid region 22 and a spring region 24 located between the actuator arm mounting region 18 and the rigid region. The rigid region 22 includes a load point dimple (not shown) for contacting the slider mounting region of the flexure 10. Load beam 12 also includes a headlift 28 extending distally from the rigid region 22.

Load beam 12 as shown in FIG. 1 is a representative example of load beam that can be employed with the current invention. Load beam 12 can vary from the illustrated example without departing from the scope of the invention. For example, the load beam can include a variety of different mounting regions, rigid regions of various shapes and sizes. Load beams without headlifts, loadpoint dimples, or having other additional features can also be employed. In addition, load beam 12 can be formed from a unitary piece of material or a plurality of individual pieces attached to each other.

Flexure 10 is attached, for example, by welding, to a major surface 13 of the load beam 12. Flexure 10 includes a generally flat spring metal layer 66 having a gimbal region 40 located at a distal end 33, a mounting region 36 for mounting the flexure to the load beam 12, and a tail region 38 extending from the mounting region at a proximal end 31. Spring metal layer 66 is made of stainless steel or another suitable material. The gimbal region 40 includes a pair of spring arms 42 extending distally from the mounting region 36 along each side of the flexure 10. The spring arms 42 are joined by a cross member 44 located near a distal end 33 of the flexure 10. A tongue 46 extends proximally from the cross member 44 and laterally inboard of the spring arms 42. Tongue 46 is a slider receiving portion of the flexure 10. Tongue 46 supports a slider 50, which includes a magnetic head (not shown) adapted to read and write information to a hard disk (not shown). Flexure 10 contacts the dimple (not shown) of the load beam 12 to allow the flexure to gimbal as needed to provide the proper attitude for the slider 50 with respect to the hard disk. The spring metal layer 66 of flexure 10 can assume a variety of shapes and sizes without departing from the scope of the invention. Processes such as those described generally in the Matsumoto et al. U.S. Pat. No. 5,666,717 can be used to manufacture flexure 10. U.S. Pat. No. 5,666,717 is incorporated herein by reference in its entirety. Processes and equipment of the types disclosed in copending and commonly assigned application Ser. No. 11/339,427 entitled Single Pass, Dual Thickness Electroplating System For Head Suspension Components can also be used to manufacture the flexure 10. Application Ser. No. 11/339,427 is incorporated herein by reference in its entirety.

In one embodiment, flexure 10 also includes a plurality of conductive leads or traces 52 extending along at least a portion of a first major surface 14 of the flexure. Each of the conductive leads 52 has a first termination pad 54 located on one end of the conductive lead in an external connection area 63 and a second termination pad 56 located on another end of the conductive leads adjacent to or on the tongue for connection to slider 50. Flexure 10 also includes a plurality of conductive leads or traces 58 located on a second major surface 16. Each of the conductive leads 58 has a first termination pad 60 located on one end of the conductive lead in an external connection area 64 and a second termination pad 62 located on another end of the conductive leads adjacent to or on the tongue 46 for connection to slider 50. External connection area 64 is located on the second major surface 16 at a location generally opposite the flexure 10 from external connection area 63 on the first major surface 14.

Figures 2A, 2B:
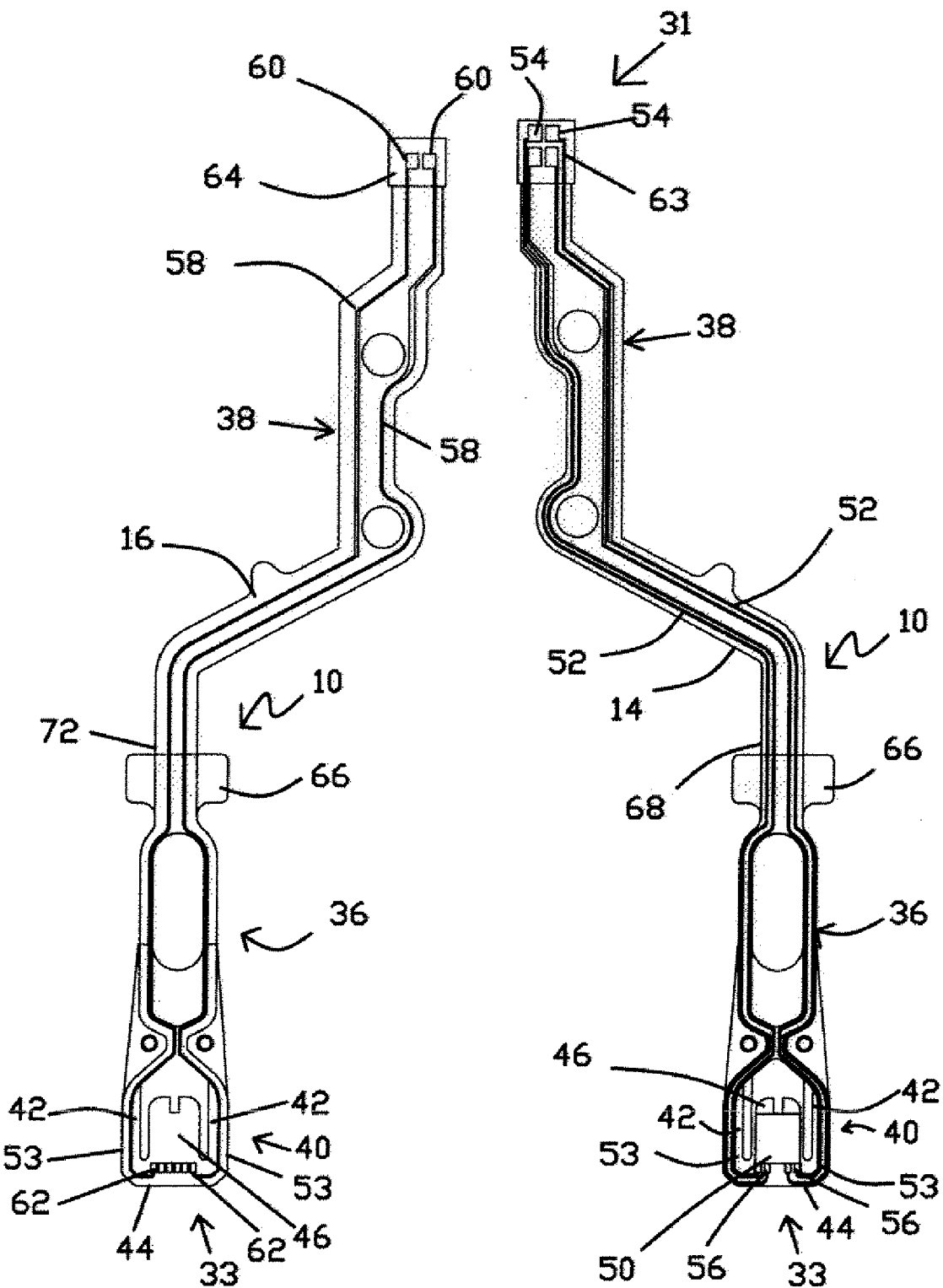
FIGS. 2A-B are plan views of the opposing surfaces of the flexure shown in FIG. 1 having conductive leads extending along a portion of each the top and bottom surfaces of the flexure.
Figure 2C:
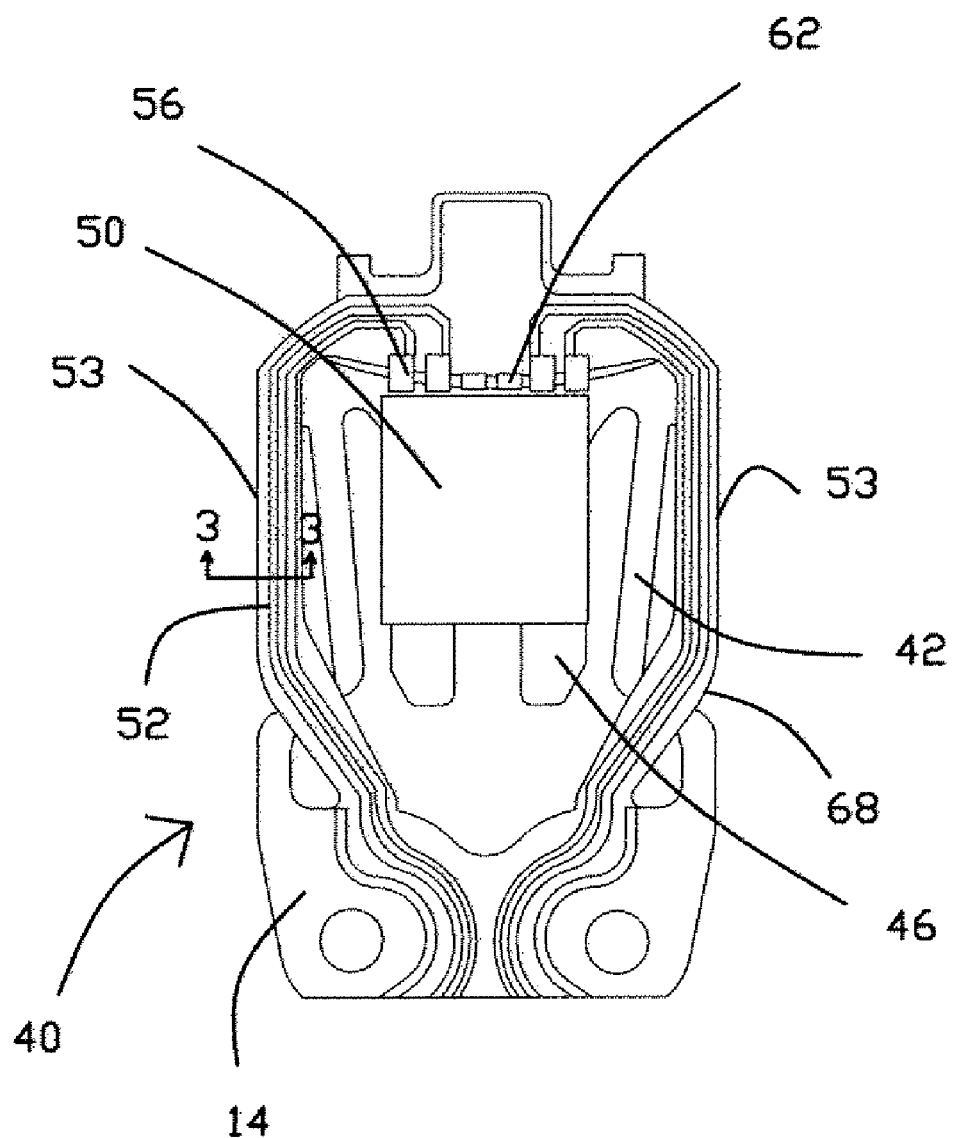
FIG. 2C is a detailed view of the gimbal region of the flexure shown in FIG. 2A.

As shown in FIGS. 2A-2C, termination pads 56 and 62 are located on the first and second sides 14 and 16, respectively, of the flexure 10. However, termination pads 62 are located adjacent to gaps in material layers 58, 72, 66, 68 and 52, enabling access for electrical connections between the termination pads 62 and terminals (not shown) on slider 50.

Conductive leads 52 and conductive leads 58 are positioned so that they extend along each lateral side of a longitudinal axis 6 of load beam 12 in the gimbal region 40 of the flexure 10 when the flexure is attached to the load beam. While the plurality of conductive leads 52 and 58 extend along the spring metal layer 66 for a majority of their length, in the gimbal region 40, conductive leads 52, 58 each include a portion that extends off the spring metal layer 66 and is unsupported by the spring metal layer. This portion of the conductive leads is known as a gimbal flying lead region 53. In one embodiment, the gimbal flying lead region 53 is positioned laterally outboard of the spring arms 42. In other embodiments (not shown), the gimbal flying lead region 53 may be positioned inboard or partially inboard of the spring arms 42. In still other embodiments (not shown), the conductive leads 52 and 58 can be positioned along the spring arms 42 and thus the conductive leads may not include a gimbal flying lead region.

Figure 3:
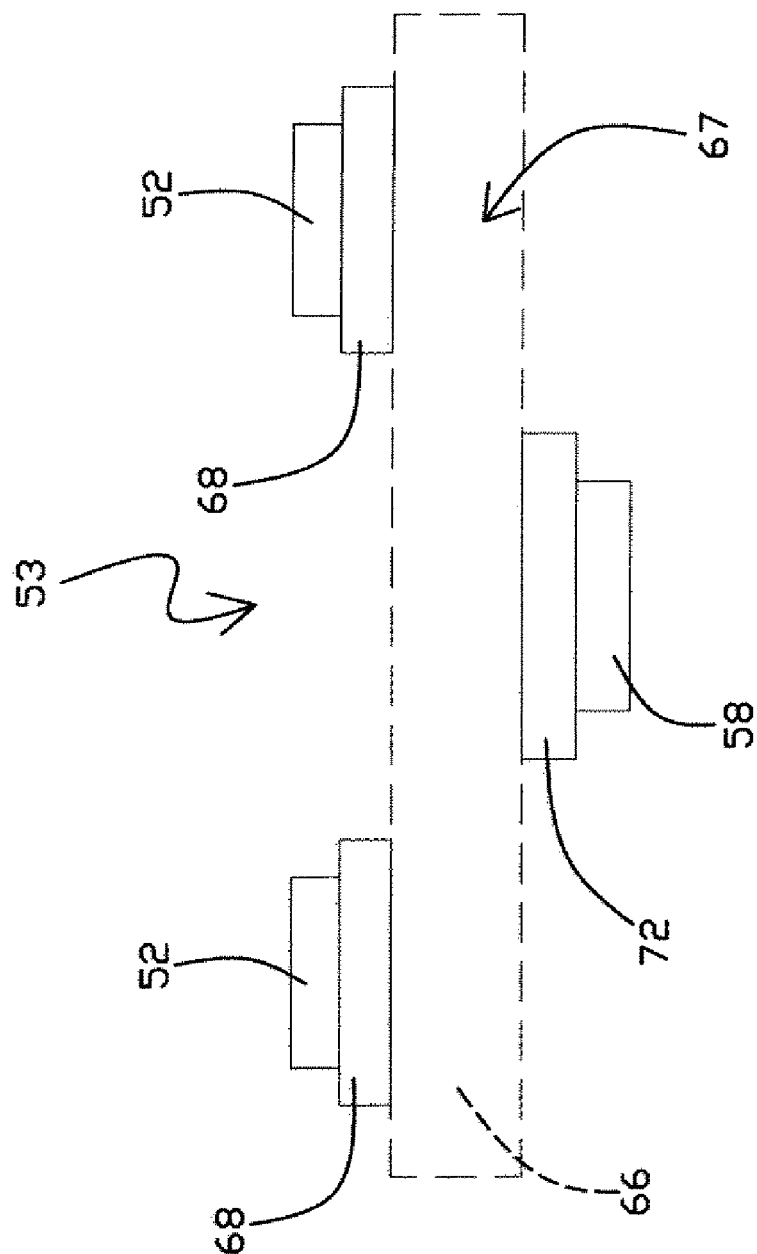
FIG. 3 is a fragmentary cross-sectional view taken along line 3-3 of FIG. 2C, showing a flying lead region of the conductive leads extending along the gimbal region.

FIG. 3 is a fragmentary cross sectional view of the flexure 10 taken along line 3 in FIG. 2C showing one of the gimbal flying lead regions 53 of the flexure 10 according to one embodiment. The conductive leads 58 on the second major surface 16 are positioned generally opposite conductive leads 52 on the first major surface 14. As is described above, the gimbal flying lead portions 53 are unsupported by the spring metal layer. The conductive leads 52 and 58 extend along two layers 68 and 72 of a dielectric material with a gap 67 between the layers. The dielectric material layers 68 and 72 will be described in more detail below. Positioning the conductive leads 58 opposite (that is, similarly laterally displaced) conductive leads 52 in the gimbal flying lead region 53 balances the flying leads, which improves the hygrothermic stability of the flexure. As shown in FIG. 3, the conductive leads 52 and 58 are laterally offset with respect to each other. During the manufacture of the flexure, dielectric material layers 68 and 72 are applied to the spring metal layer 66, shown in dashed lines in FIG. 3. The conductive leads 52 and 58 are then additively applied to the dielectric material layers 68 and 72, respectively. Once the conductive leads are applied, the spring metal layer 66 is etched away in the gimbal flying lead region 53. By having the conductive leads 52 and 58 laterally offset with respect to each other, the spring metal layer 66 can be effectively etched away, leaving both conductive leads 52 and 58 in the gimbal flying lead region 53.

Figure 4:
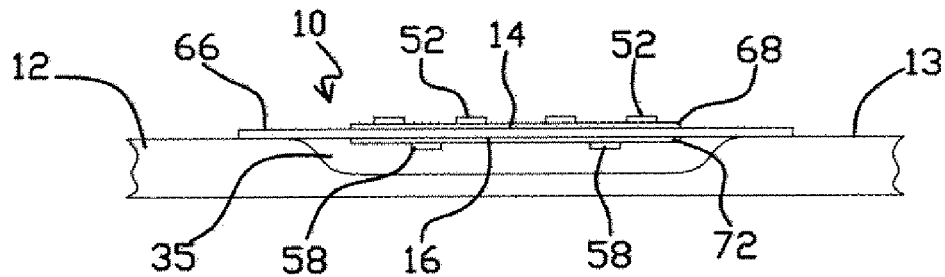
FIG. 4 is a cross-sectional view of a portion of the suspension assembly taken along line 4-4 in FIG. 1 showing a channel in the load beam in which the conductive leads attached to one surface of the flexure are located.

When the flexure is attached to the load beam 12 as shown in FIG. 1, a portion of the second major surface 16 of the flexure is positioned adjacent to, and in contact with, a portion of the major surface 13 of the load beam. With conductive leads 58 extending along the second major surface 16 of flexure 10, a portion of the conductive leads 58 are necessarily positioned between the spring metal layer 66 of the flexure 10 and the major surface 13 of the load beam 12. FIG. 4 shows a cross sectional view the flexure 10 positioned adjacent to the major surface 13. A channel 35 extends along the major surface 13 of the load beam 12 adjacent a portion of the flexure 10 having conductive leads 58 so that the conductive leads are positioned within the channel. The channel 35 is wide enough to accept the plurality of conductive leads 58 within the channel, but narrow enough so that a portion of the spring metal layer 66 of flexure 10 rests upon the major surface 13 of the load beam 12 on each side of the channel. The channel 35 prevents the conductive leads 58 positioned on the second major surface 16 of the flexure 10 from being wedged against the second major surface of the flexure, thereby preventing stress from being introduced into the flexure and wear on the leads or cover layer on the leads (not shown in FIG. 4). Channel 35 can be located on any portions of load beam 13 adjacent to conductive leads 58 or other structures extending from the surface of spring metal layer 66.

Figure 5:
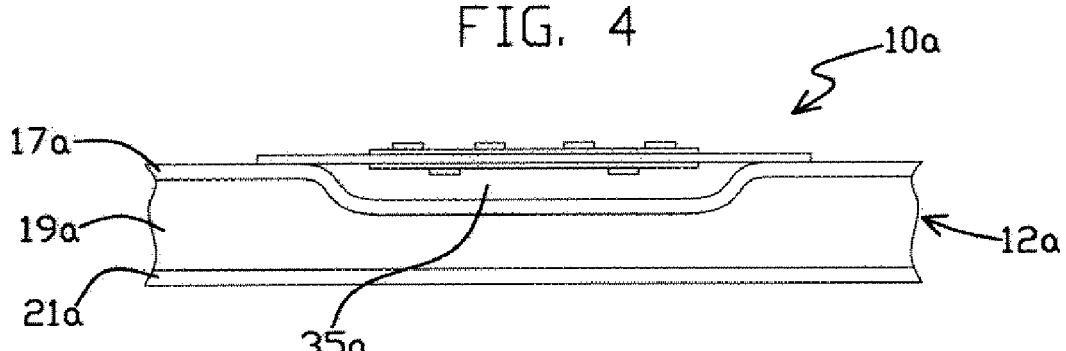
FIG. 5 is a cross-sectional view of a portion of a suspension assembly, showing a channel in the load beam according to another embodiment of the invention.
Figure 6:
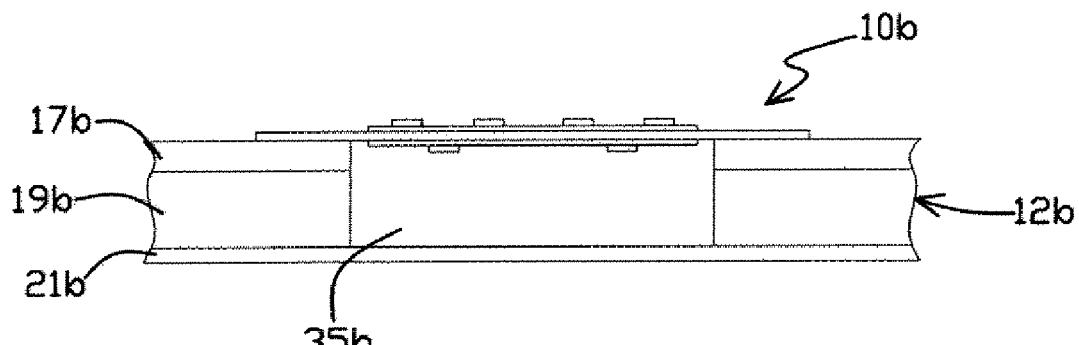
FIG. 6 is a cross-sectional view of a portion of a suspension assembly, showing a channel in the load beam according to still another embodiment of the invention.
Figure 7:
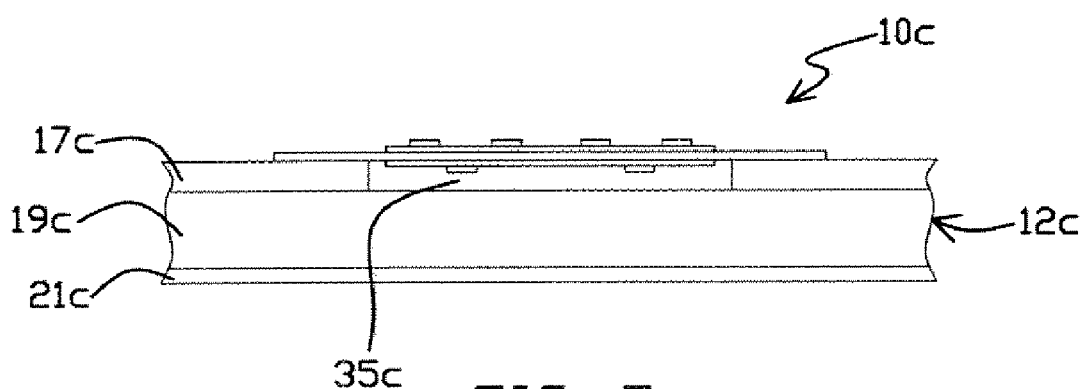
FIG. 7 is a cross-sectional view of a portion of a suspension assembly, showing a channel in the load beam according to still another embodiment of the invention.

In one embodiment shown in FIG. 4, the channel 35 is formed by removing spring metal material from the major surface 13 of the load beam 12 such as by etching the load beam. The spring metal material can be removed from the load beam 12 by chemically or mechanically etching the spring metal material. FIGS. 5-7 show other embodiments of a channel formed into load beams formed from laminated layers. FIG. 5 shows flexure 10*a* attached to a laminate load beam 12*a* having a first spring metal layer 17*a*, a polyimide layer 19*a*, and a second spring metal layer 21*a*. A force is applied to the load beam 12*a* to compress the polyimide layer 19*a* and deform first spring metal layer 17*a* to form channel 35*a*. In another embodiment, shown in FIG. 6, flexure 10*b* is attached to a laminate load beam 12*b*. Material is removed, such as by etching from the first spring metal layer 17*b* and the polyimide layer 19*b* to form channel 35*b*. Layer 21*b* is a stainless steel layer. In yet another embodiment, shown in FIG. 7, flexure 10*c* is attached to a laminate load beam 12*c*. Channel 35*c* is formed by removing material from spring metal layer 17*c*, but not polyimide layer 19*c* or spring metal layer 21*c*.

Figure 8:
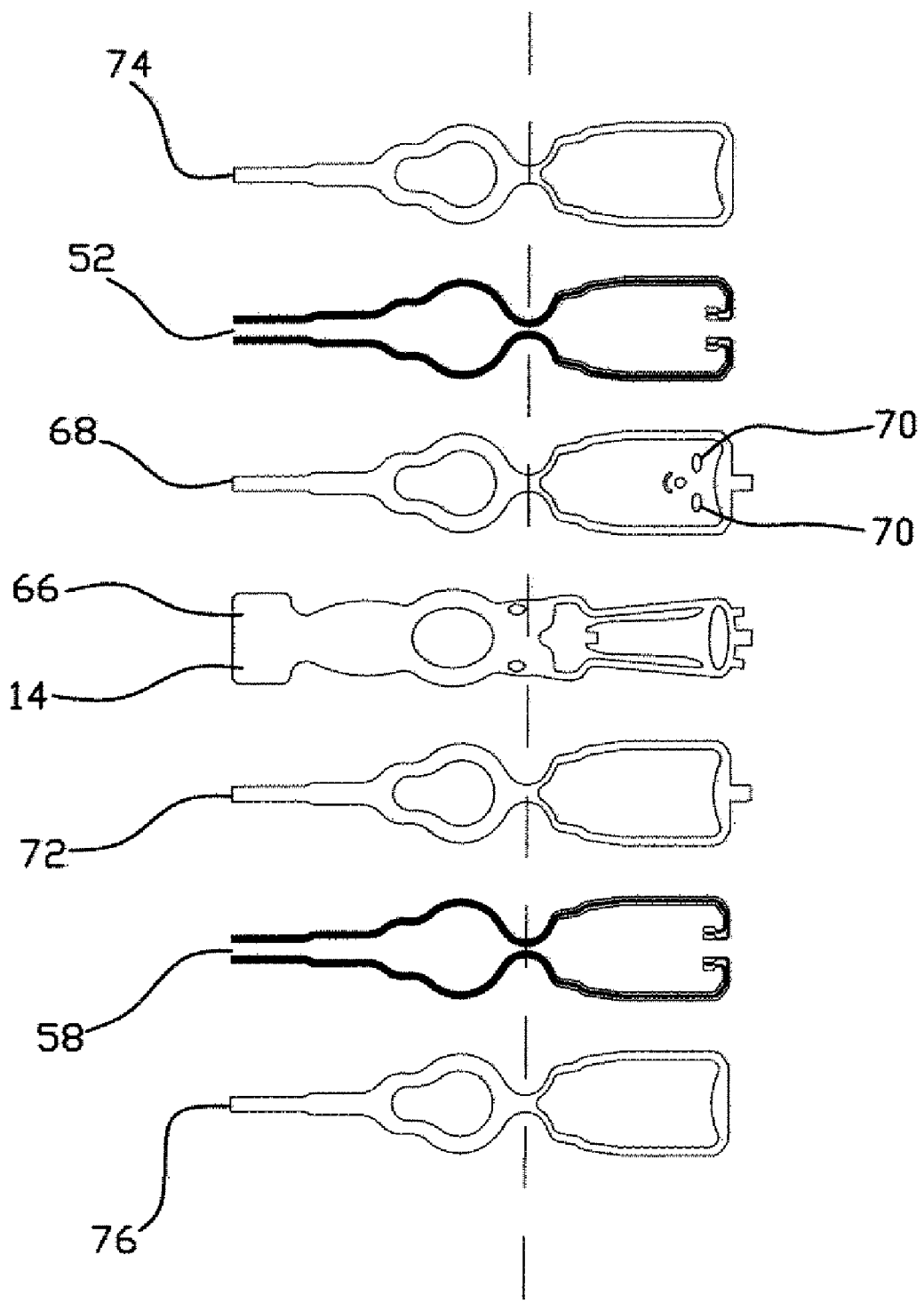
FIG. 8 is an exploded view of a distal end of the flexure of FIG. 2A, illustrating multiple layers of materials additively formed to the flexure.

FIG. 8 is an exploded view of a distal portion of the flexure 10 showing the individual layers separated from one another. A first patterned dielectric layer 68 is applied on the first major surface 14 of the spring metal layer 66. First patterned dielectric layer 68 includes a plurality of pads 70 for engagement with a slider to properly align the slider. Likewise, a second patterned dielectric layer 72 is applied to the second major surface 16 of the spring metal layer. Each of the dielectric layers can be made of a dielectric material such as a photosensitive polyimide. The dielectric layers 68 and 72 provide an insulating layer to electrically isolate the conductive leads 52 and 58 from the spring metal layer 66. Conductive leads 52 and conductive leads 58 are additively applied to the first patterned dielectric layer 68 and second patterned dielectric layer 72, respectively. Conductive leads 52 and conductive leads 58 can be made of one or more conductive materials, including copper, gold, nickel, silver, aluminum or an alloy containing some of these materials.

Figure 9:
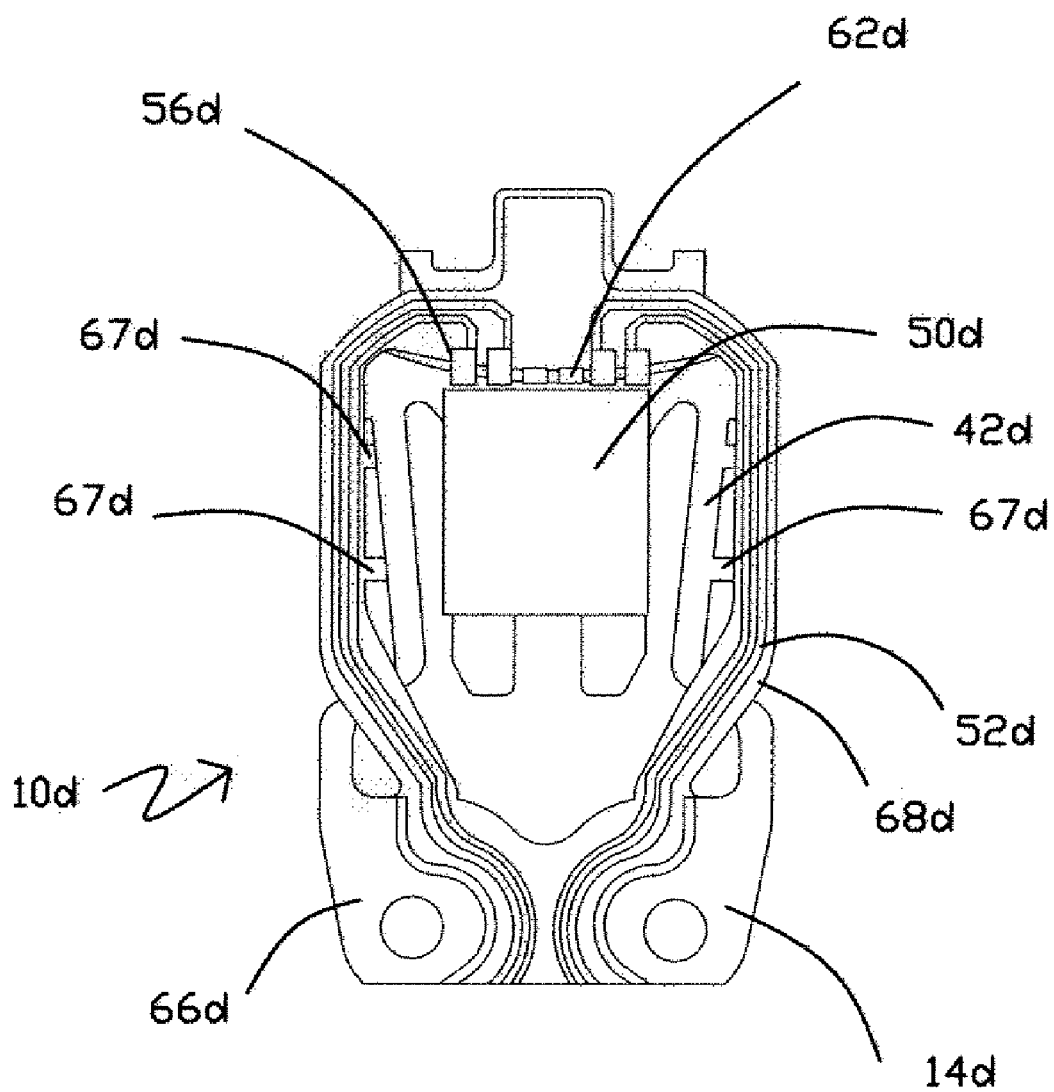
FIG. 9 is a detailed view of a gimbal region of the flexure having tabs extending from spring arms to support conductive leads in a gimbal flying lead region according to another embodiment of the invention.

Referring again briefly to FIGS. 2C and 3, in the gimbal flying lead region 53, the conductive leads 52 and 58 are unsupported by the spring metal layer 66. When the conductive leads 52 and 58 are applied to the first patterned dielectric layer 68 and second patterned dielectric layer 72 during the manufacturing process, the spring metal layer 66 includes material (shown by dashed line in FIG. 3) in the area where the gimbal flying lead region 53 is located. After the conductive leads 52 and 58 are additively applied to the first patterned dielectric layer 68 and second patterned dielectric layer 72, the spring metal layer 66 is etched away using a process similar to that used to form channel 35 (shown in FIG. 4). In the embodiment shown, the conductive leads 52 and 58 are not identically laterally displaced to provide enhanced etching access to the spring metal layer 66. In other embodiments (not shown) conductive leads 52 can be identically laterally displaced. In still other embodiments (not shown) leads 52 can overlap leads 58. In another embodiment shown FIG. 9, the spring metal layer 66*d* of flexure 10*d* can be etched to leave one or more tabs 67*d* extending laterally from the spring arms 42*d* and between conductive leads 52*d* that extend along a first major surface 14*d* and conductive leads that extend along a second major surface (not shown in FIG. 9) to provide support to the conductive leads.

Referring again to FIG. 8, a first cover layer 74 and a second cover layer 76 are positioned over portions of the conductive leads 52 and conductive leads 58, respectively. The cover layers 74, 76 are each made of a dielectric material such as a photosensitive polyimide. The dielectric material that makes up the cover layers may be the same material as that is used to make the patterned dielectric layers 68 and 72. The first cover layer 74 and the second cover layer 76 provide protection for the conductive leads, such as from corrosive elements. The first cover layer 74 and the second cover layer 76 cover a portion of the conductive leads 52 and conductive leads 58, respectively, but do not cover at least the termination pads 54, 60 of each of the conductive leads, thereby allowing electrical connections to be made between the termination pads and other electrical components or conductors. In addition, other portions of the conductive leads 52, 58 may remain uncovered by the cover layers 74 and 76 to allow electrical connection with other conductors (not shown).

The dielectric layers 68 and 72, the conductive leads 52 and 58 and the cover layers 74 and 76, shown in FIG. 5, are applied to the spring metal layer 66 using additive processes. As an example, dielectric layer 68 is applied to the first layer 14 of the spring metal layer using known processes to form the patterned layer of material. Conductive leads 52 are subsequently formed onto the dielectric layer 68 using electroplating or electroless plating. Cover layer 74 is then formed onto the flexure 10 using known processes to pattern and cure the dielectric material.

Figure 10:
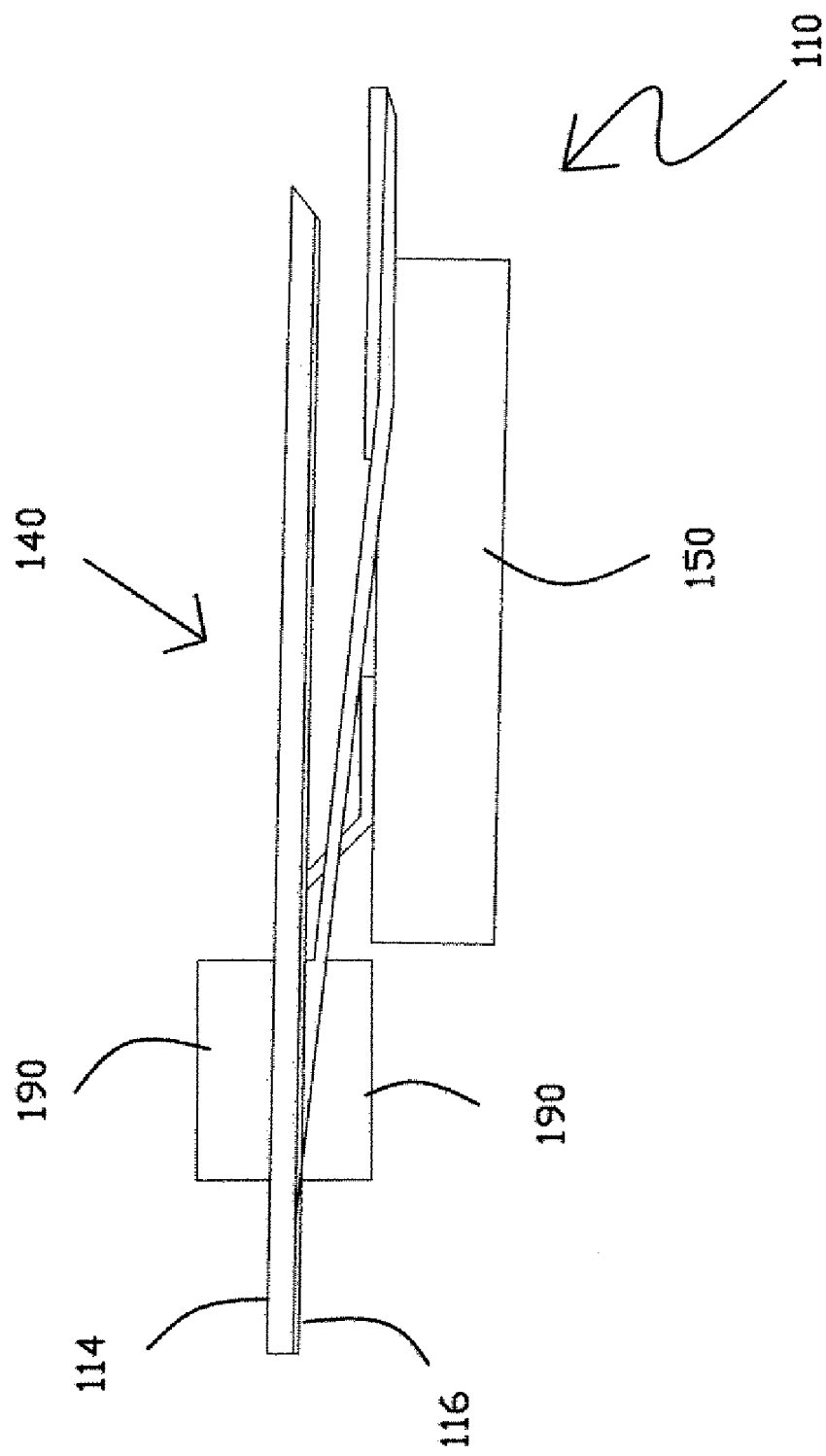
FIG. 10 is a side view of a gimbal region of a flexure having microactuators in accordance with another embodiment of the invention.
Figure 11:
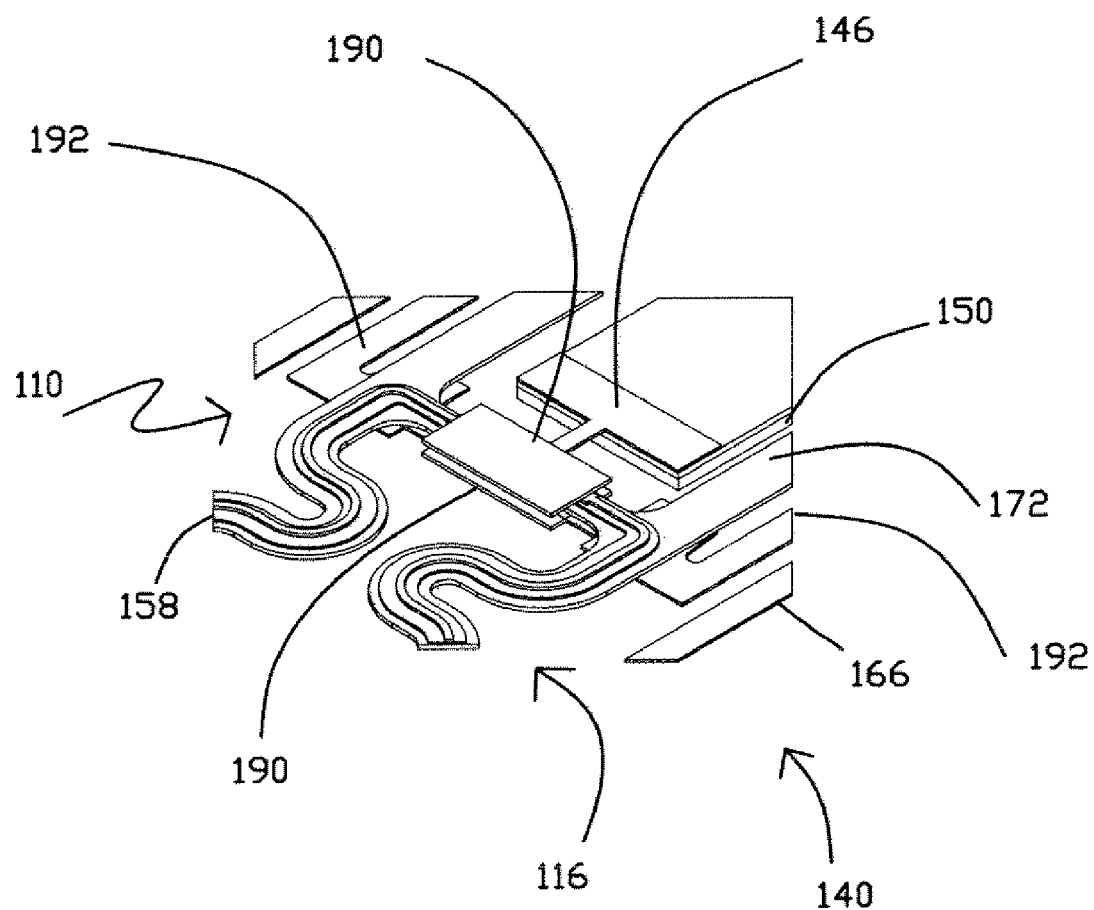
FIG. 11 is a perspective view of a portion of a first major surface of the flexure of FIG. 10.
Figure 12:
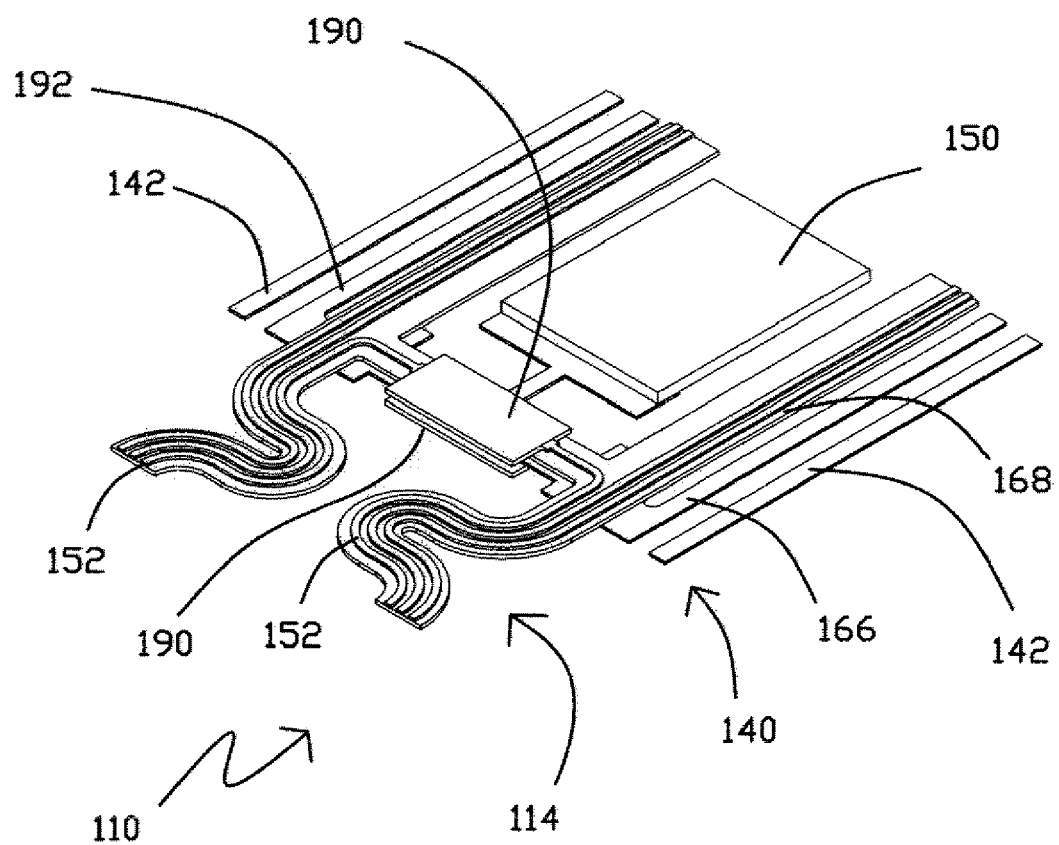
FIG. 12 is a perspective view of a portion of a second major surface of the flexure of FIG. 10.
Figure 13C:
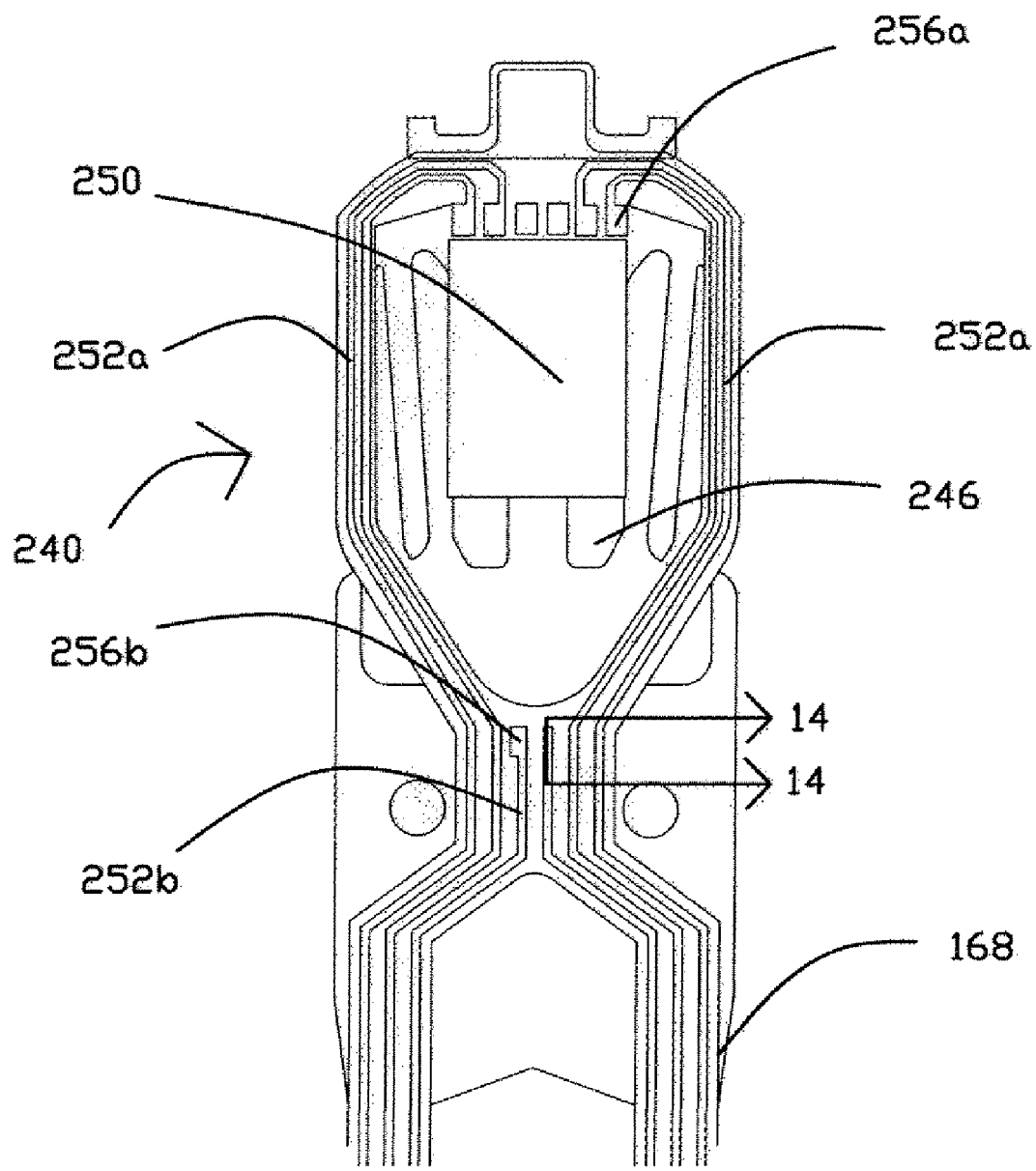
FIGS. 13C-D are detailed views of the gimbal regions of the flexure shown in FIGS. 13A-B.
Figure 13D:
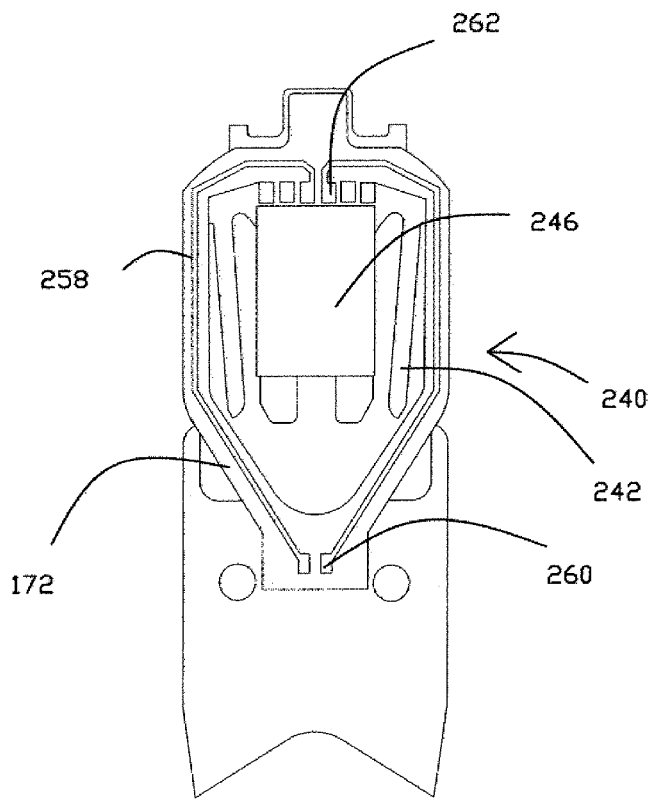

While the embodiment described above refers to a plurality of conductive leads as connecting only to a slider, alternatively, conductive leads may be included to provide electrical signals to other components on the flexure. FIGS. 10-12 show a distal end of a flexure 110 according to another embodiment of the invention. Flexure 110 includes a pair of microactuators 190 attached to a gimbal region 140 of the flexure. Flexure 110 includes a pair of movable arms 192 to which microactuators 190 are attached. The microactuators 190 move portions of flexure 110, including tongue 146, in a transverse direction when actuated. The microactuators 190 shown in FIGS. 10-12 are piezoelectric actuators, however, other types of actuators may be used, including rotor/stator actuators, for example. Flexure 110 has conductive leads 152 and 158 extending from the tail region (not shown) to the gimbal region 140 to couple electrical signals to the microactuators 190. The conductive leads that couple electrical signals to the microactuators 190 may be selected from the plurality of conductive leads 152 on a first major surface 114 and/or the plurality of conductive leads 158 a second major surface 116 of flexure 110. Alternatively or in addition, flexure 110 can include one or more other electrical components such as strain gauges, and conductive leads for coupling electrical signals to the components in the gimbal region. The conductive leads can be routed along the first and second major surfaces 114, 116 of flexure 110.

FIGS. 13A-D illustrate a flexure 210 according to another embodiment of the invention. Flexure 210 has a plurality of conductive leads or traces 252*a* and 252*b* located on a first major surface 214 of the spring metal layer 266. Each of the plurality of conductive leads 252a and 252b extend distally from one of first termination pads 254 located in an external connection area 246 at a proximal end 231 of the flexure 210. Conductive leads 252a each extend along nearly the entire length of the flexure distally along the tail 238, mounting region 236, and across the gimbal region 240 to a second terminal pad 256a located adjacent to or on tongue for connecting to a slider 250. Conductive leads 252b extend distally along the tail 238 and the mounting region 236, to a second termination pad 256b located adjacent to the gimbal region 240.

Flexure 210 also has a plurality of conductive leads or traces 258 extending along a second major surface 216 of the spring metal layer 266. Each of the conductive leads 258 extend from a first termination pad 260 to a second termination pad 262, which is located adjacent to or on tongue 246 for connecting to the slider 250. Each of the first termination pads 260 of the conductive leads 258 is aligned with a second termination pad 256b of a conductive lead 252b oppositely located on the first major surface 214 of the spring metal layer 266.

Figure 14:
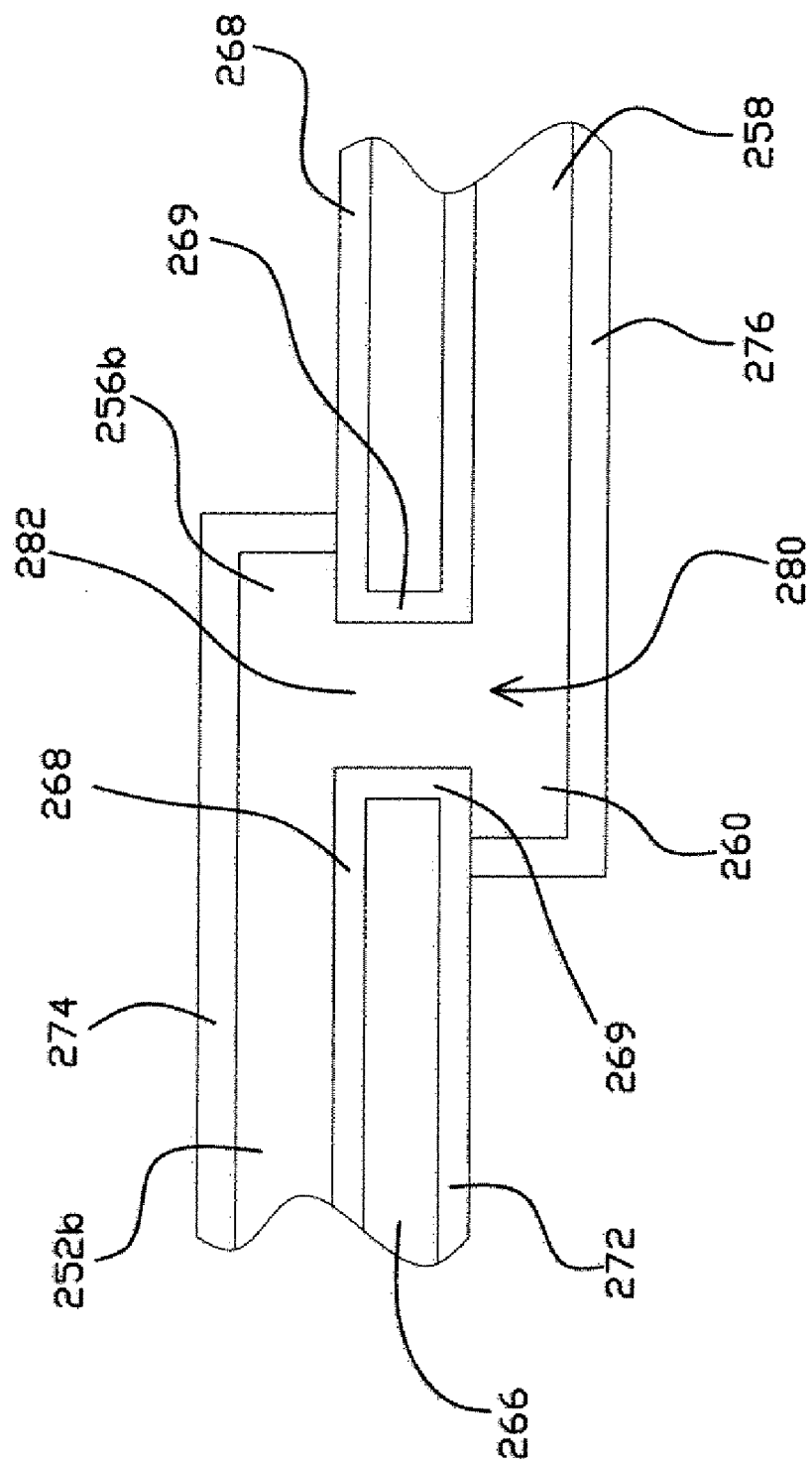
FIG. 14 is a fragmentary cross-sectional view taken along the line 14-14 of FIG. 13C showing an electrical connection between a conductive lead positioned on one major surface and a conductive lead positioned on the other major surface of the flexure.

As is shown in FIG. 14, the second termination pads 256b of conductive leads 252b are electrically connected by a conductive plug or via 282 that extends through an aperture 280 in the spring metal layer 266 of the flexure 210 to a first termination pad 260 of conductive lead 258. Via 282 is electrically isolated from the spring metal layer 266 by dielectric layer 269, which extends into the aperture 280. Flexure 210, then, has conductive leads (252a and 252b as shown in FIG. 13A) only on the first major surface 214 from the proximal end 231 of the flexure extending distally along the tail 238 and the mounting region 236. Conductive leads 252b on the first major surface 214 are then fed through the spring metal layer 266 so that conductive leads extend along the first major surface 214 and the second major surface 216 in the gimbal 240. The via 282 is electrically isolated from the spring metal layer 266 by a layer of dielectric material 269 that is positioned in the aperture 280 between the spring metal layer and the via. As described above with regards to other embodiments, the dielectric layer 269 and the via 282 are formed using additive processes. The dielectric layer 269 is shown in FIG. 14 to be contacting both of the dielectric layers 268 and 272. Dielectric layer 269 may be formed simultaneously with either of the dielectric layers 268 or 272 or in a separate additive step.

Electrically connecting the conductive traces 252b to conductive traces 258 that extend along the gimbal region 240 on the second major surface 216, provides the advantage of reduced width through the gimbal region without having to provide a channel on the major surface of a load beam (not shown) to which the flexure 210 is attached. Alternatively, any such channel would be limited to an area near the gimbal region 240 of the flexure 210 where conductive traces 258 might extend along the major surface of the load beam. In addition, the first termination pads 254, located in the external connection area 246 are all located on the first major surface 214 of the flexure 210. With the exceptions explained above, the flexure 210 is substantially similar to flexure 10 and similar features are identified using reference numbers in the 2XX series.

While each of the conductive traces of flexure 210 are eventually connected to the slider 250, either after extending along the first major surface 214 or after being electrically connected through the spring metal layer 266 to conductive leads 258 on the second major surface 216, alternatively, additional conductive leads may be added to connect with other elements (not shown) such as microactuators or sensors. As in the case with previous embodiments, these additional conductive leads may be positioned on the first major surface 214. Alternatively, they may be fed through the spring metal layer 266 to the second major surface 216. While the vias 282 to feed conductive leads from one major surface to the other are shown positioned near the gimbal region 240, the vias may be located anywhere along the flexure 210. For example, vias 282 may be positioned on the tail portion 238 of the flexure 210.

FIGS. 15A-B and 16-18 illustrate a flexure 310 in accordance with another embodiment of the invention. Flexure 310 has a plurality of conductive leads 352 extending along a first major surface 314 each of which are connected to one of a plurality of termination pads 354 located near the proximal end 331 of the flexure. Likewise, flexure 310 has a plurality of conductive leads 358 extending along a second major surface 316 each of which are connected to one of a plurality of termination pads 360 located near the proximal end 331 of the flexure. The termination pads 354 and 360 are capable of being bonded to external circuitry (not shown). For example, an external conductive lead may be attached to a termination pad by solder ball bonding. The illustrated embodiment also includes conductive leads 357 and 359 that extend proximally from the termination pads 354 and 360 to provide connection locations at the proximal end 331 of the flexure 310 on each of the first major surface 314 and the second major surface 316. Other embodiments (not shown) do not include leads 357 and 359.

Flexure 310 includes a first ground layer 367 positioned between the spring metal layer 366 and conductive leads 352 and a second ground layer 369 positioned between the spring metal layer 366 and conductive leads 358. The ground layers 367 and 369, in one embodiment, extend along all or substantially all of the first surface 314 of the spring metal layer 366. The ground layers 367 and 369 are formed from a conductive material such as copper or other suitable conductive materials and are in electrical communication with an electrical ground signal common to electrical circuits formed in part by conductive leads 352 and 358, respectively. Dielectric layer 368 is positioned between conductive leads 352 and first ground layer 367 to prevent unwanted electrical communication between the conductive leads 352 and first ground layer 367, although one or more of the conductive leads 352 may be in direct electrical communication with electrical ground and thus be in communication with first ground layer 367. Likewise, dielectric layer 372 is positioned between conductive leads 358 and second ground layer 369.

The first and second ground layers 367 and 369 provide a shield to prevent electrical noise from coupling onto the conductive leads 352 and 358, respectively. The first and second ground layers 367 and 369 can have any thickness. However, a desired thickness would be one that provides suitable conductivity throughout the ground layer to provide adequate protection to reduce the electrical noise conducted or transmitted onto the conductive leads. For example, first and second ground layers 367 and 369 formed from copper that have a thickness of about 3 micrometers can achieve a conductivity of 100% under the International Annealed Copper Standard (IACS).

As described above, the first ground layer 367 can extend over all or substantially all of the first surface 314 of the spring metal layer 366. This includes the gimbal region, mounting region, and tail region. Similarly, the second ground layer 369 can extend over all or substantially all of the second surface 316 of the spring metal layer 366. Further, the first ground layer 367 and the second ground layer 369 can extend beyond the first surface 314 and the second surface 316 of the spring metal layer in the gimbal flying lead region 353 where the conductive leads 352 and 358 are unsupported by the spring metal layer (e.g., as is shown in FIG. 13). The first and second ground layers 367, 369 are formed from conductive materials similar to those used to form the conductive leads 352 and 358. Similarly, the first ground layer 367 and the second ground plane layer 369 are additively applied onto the first major surface 314 and the second major surface 316 of the spring metal layer 366, respectively using processes similar to those used to apply the conductive leads 352 and 358.

Figure 19:
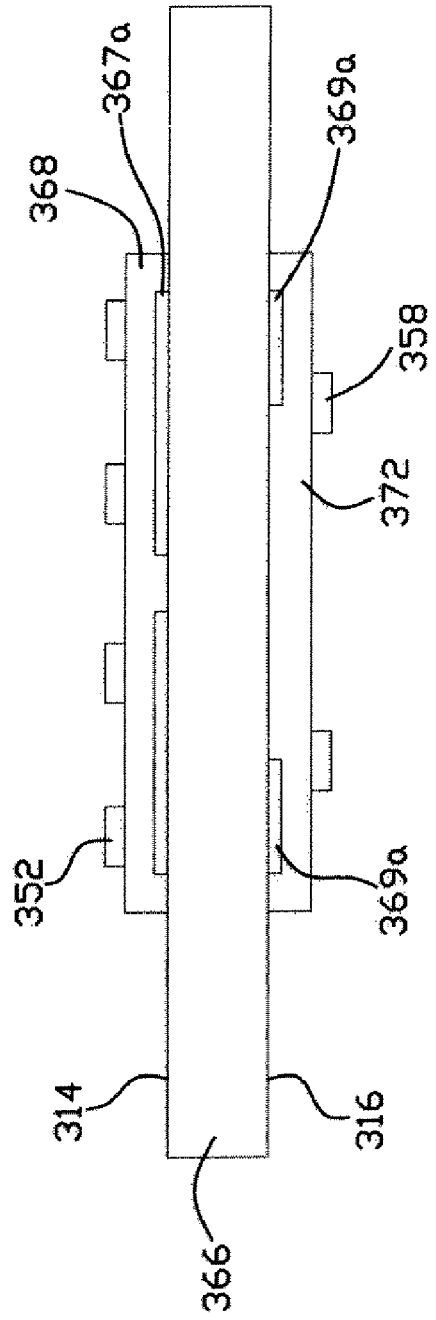
FIG. 19 is a cross-section of a portion of a flexure having a ground plane according to yet another embodiment of the invention.

Alternatively as shown in FIG. 19, the first ground layer 367a and/or the second ground layer 369a can be patterned to extend along only those portions of the spring metal layer 366 that have conductive leads. This is especially true when a flexure has an arrangement of conductive leads of the type illustrated in flexure 210 as shown in FIGS. 13A-B. In such an instance, potentially large portions of a second surface of the spring metal layer where there are no conductive leads may not have a ground layer. In yet another embodiment, the spring metal layer of the flexure may be formed from a high conductivity material (not shown). In this embodiment, the spring metal layer would have suitable conductivity to act as a ground plane to reduce the coupling of noise onto conductive leads applied to both sides of the spring metal layer. With the exceptions of the structures described above, the flexure 310 is substantially similar to flexure 10 and similar features are identified using reference numbers in the 3XX series.

Figure 15A:
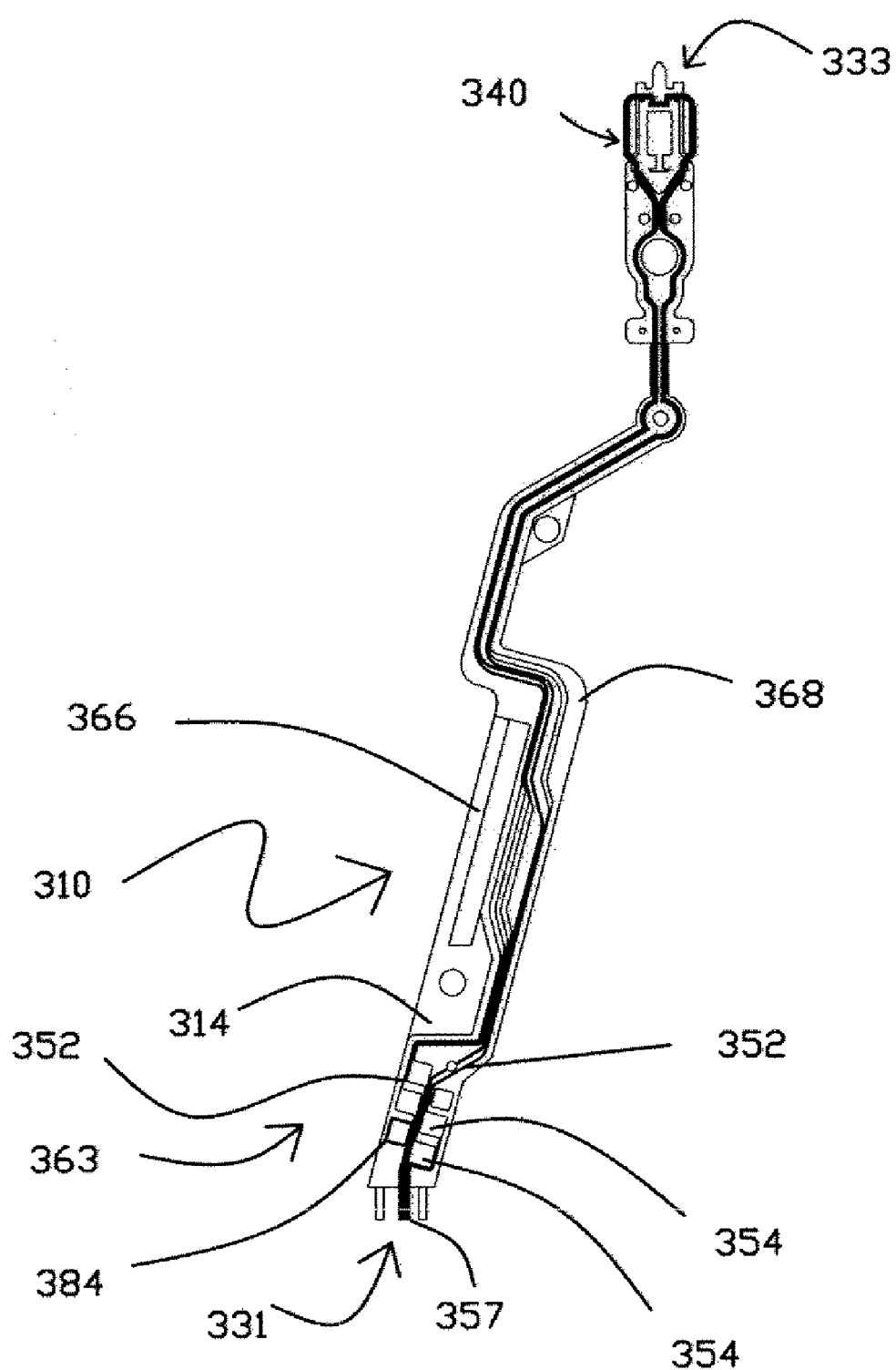
FIG. 15A is a plan view of a first major surface of a flexure having conductive traces on two opposing surfaces and a U-shaped jumper connector attached to the flexure in a tail region according to another embodiment of the invention.
Figure 15B:
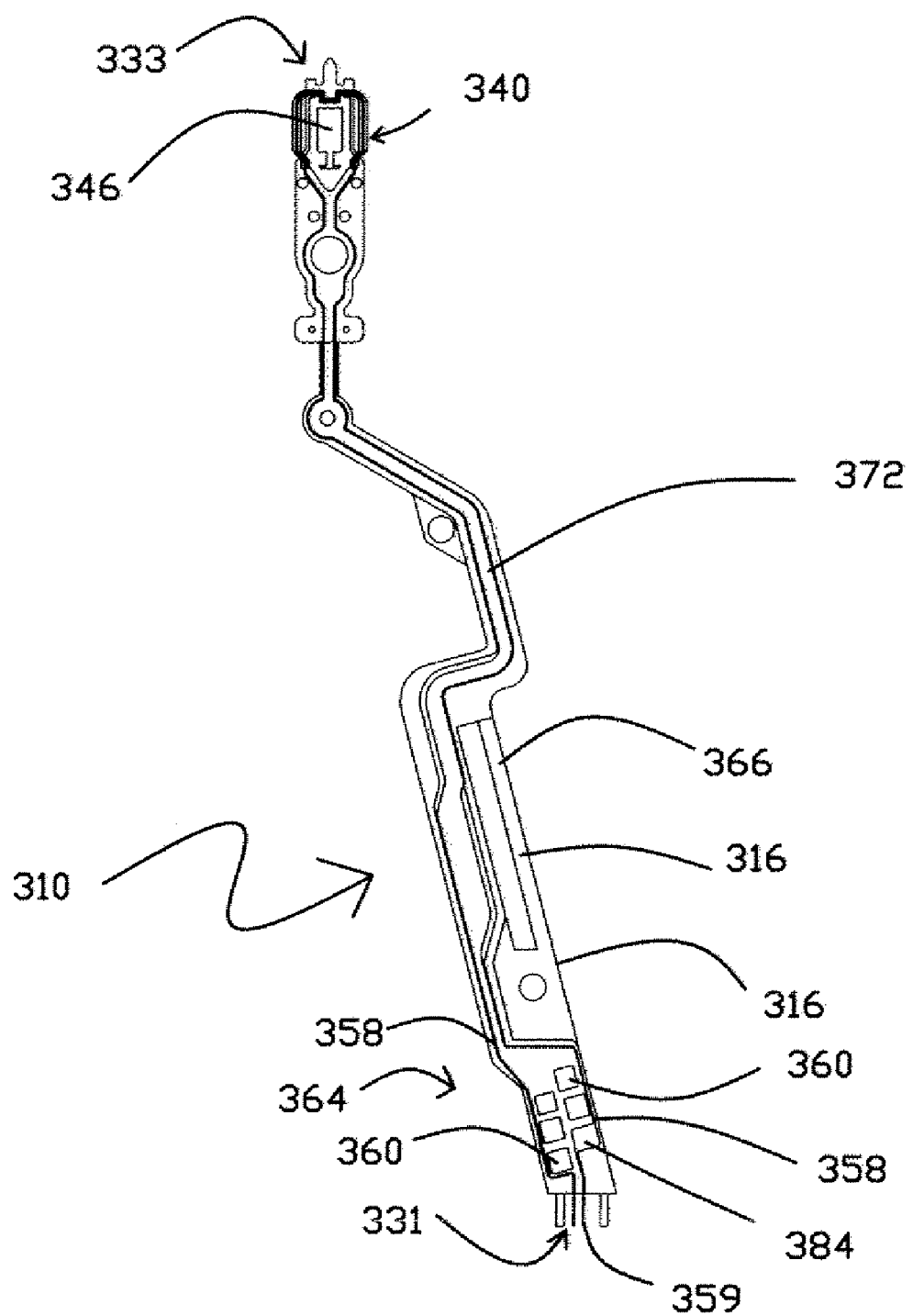
FIG. 15B is a plan view of a second major surface of the flexure shown in FIG. 15A.
Figure 16:
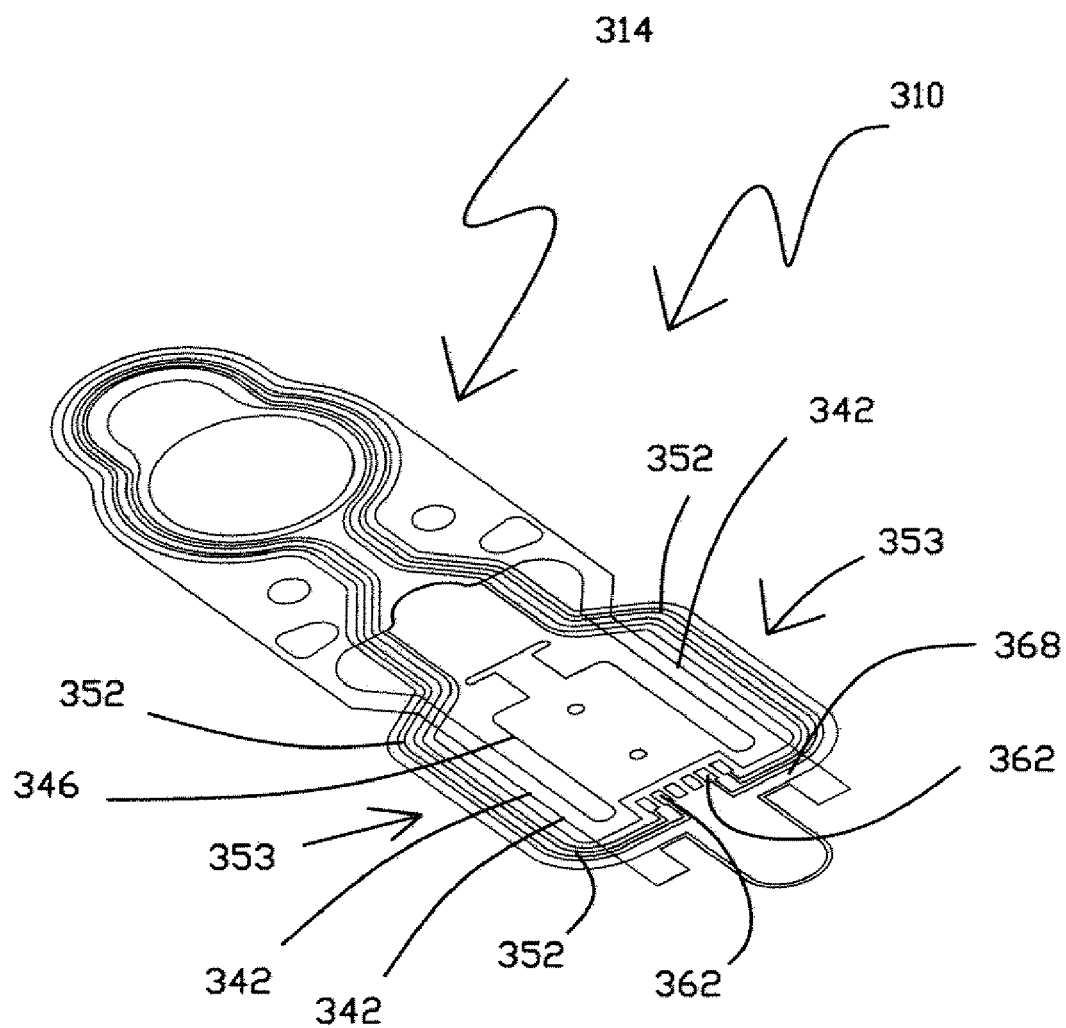
FIG. 16 is a perspective view of the first major surface of the flexure of FIG. 15A showing a gimbal region of the flexure.
Figure 17:
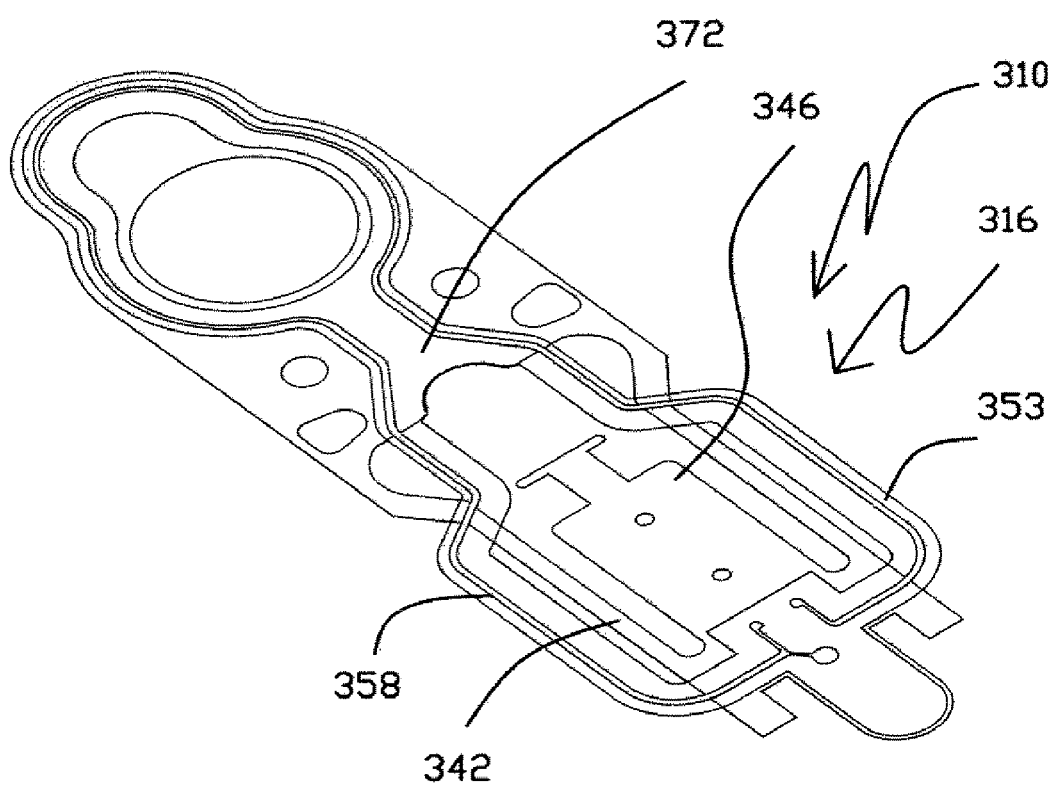
FIG. 17 is a perspective view of the second major surface of the flexure of FIG. 15B showing a gimbal region of the flexure.
Figure 18:
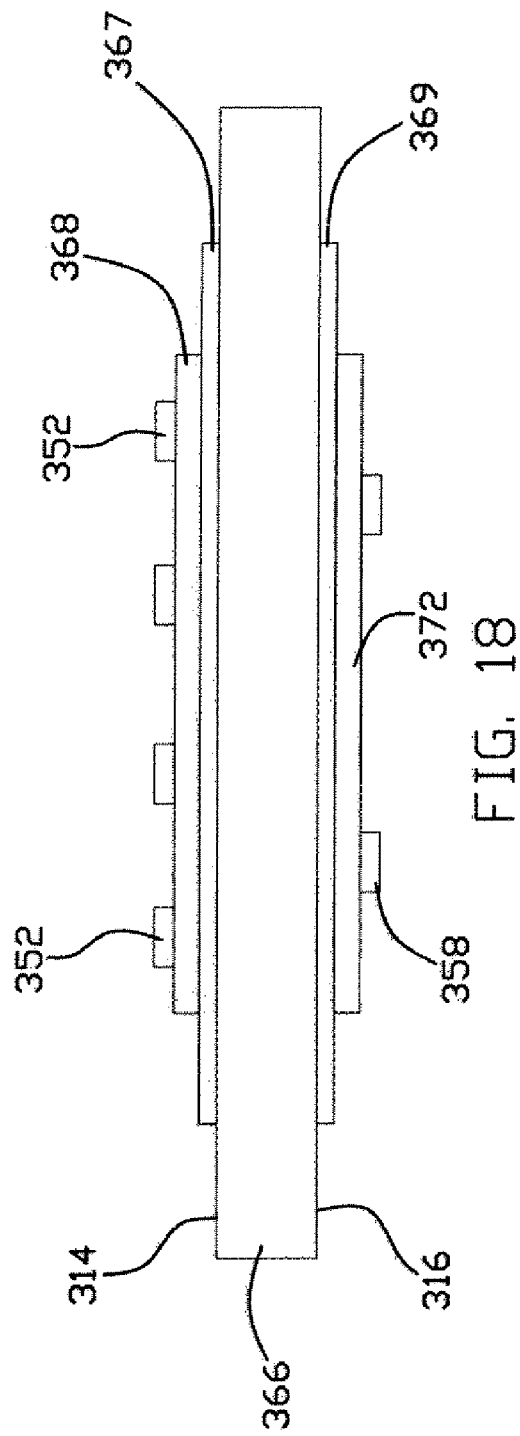
FIG. 18 is a cross-section of a portion of a flexure of the type shown in FIG. 1 having a ground plane according to another embodiment of the invention.
Figure 20:
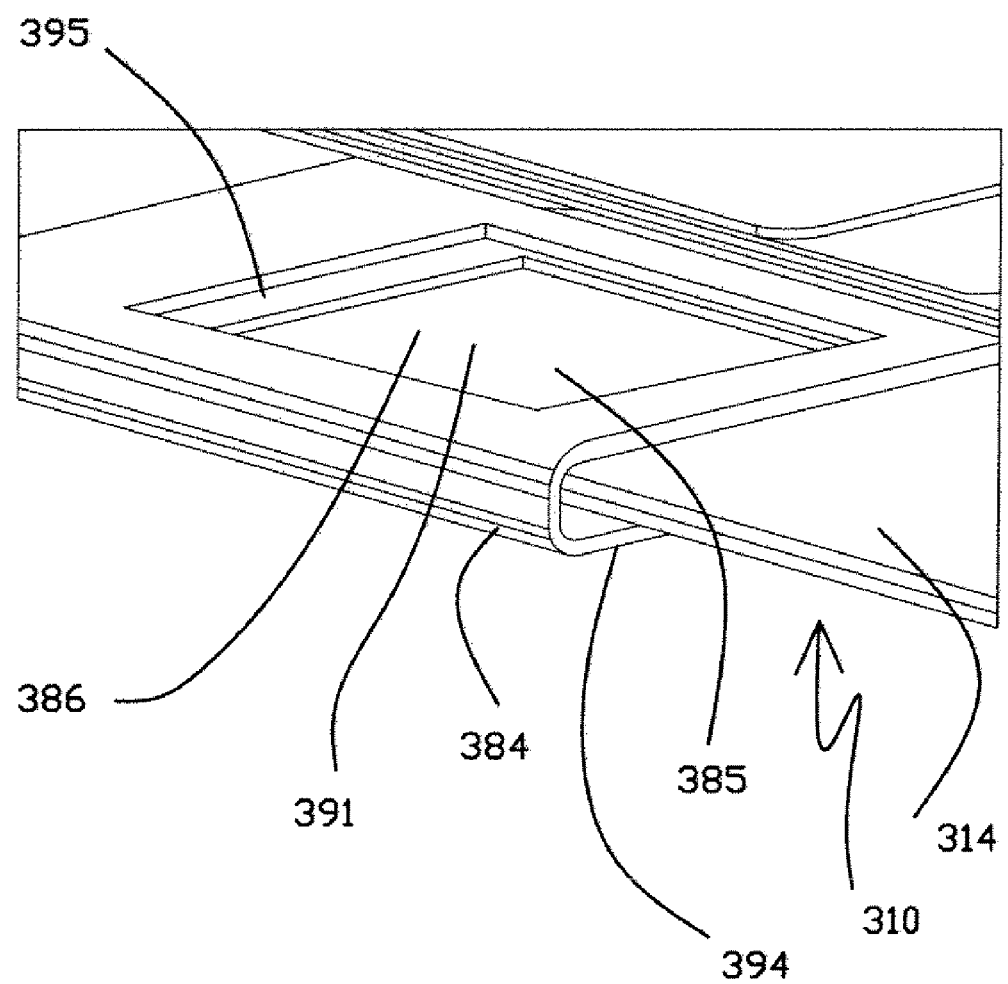
FIG. 20 is a perspective view of a portion of the tail region of the flexure of FIG. 15A showing the U-shaped jumper connector.
Figure 21A:
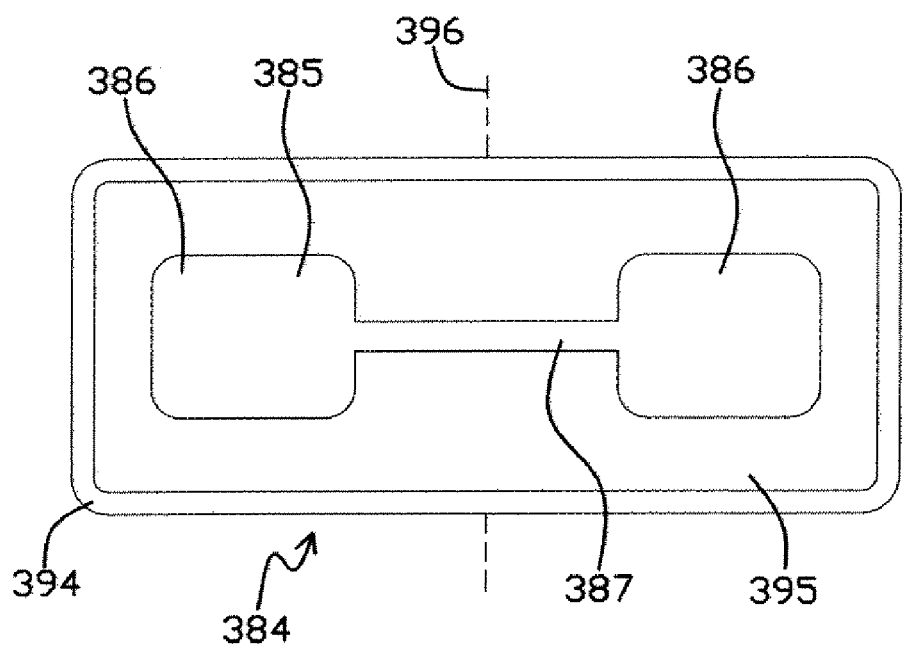
FIG. 21A is a flat pattern view showing a first major surface of the U-shaped jumper connector of FIG. 20.
Figure 21B:
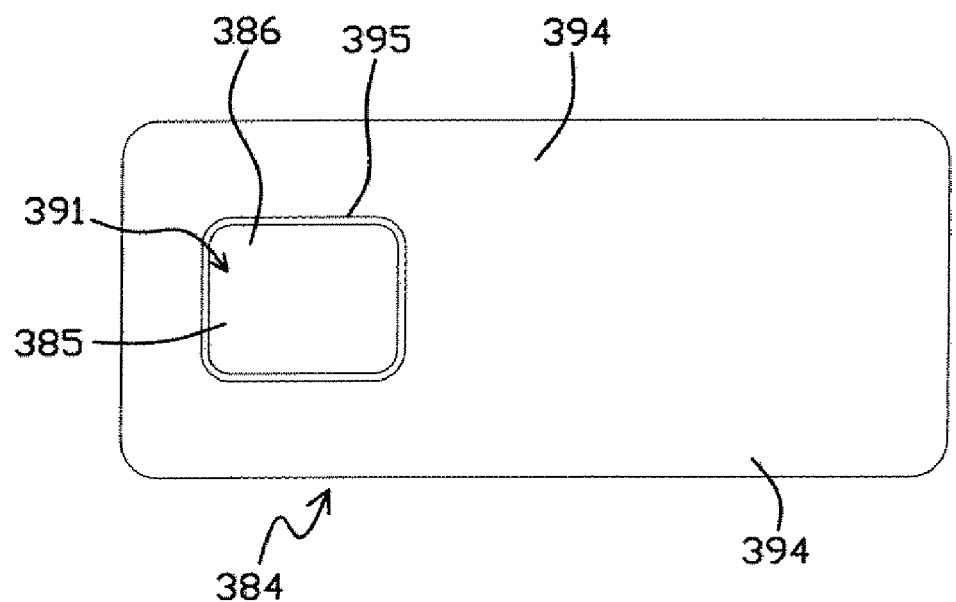
FIG. 21B is a flat pattern view showing a second major surface of the U-shaped jumper connector of FIG. 20.

As is described above, the conductive leads 352 and 358 provide connection locations near the proximal end 331 of the flexure 310 on each of their respective major surfaces 314 and 316. However, it may be desirable to provide connection locations for each of the conductive leads 352 and 358 on one surface of the flexure. Flexure 310, as shown in FIGS. 15A and 15B includes a jumper connector 384 attached to the flexure near a proximal end 331 of the flexure. The jumper connector 384 provides electrical communication between a termination pad 354 and a termination pad 360 similarly positioned on opposite major surfaces 314 and 316. FIGS. 20 and 21A-B illustrate jumper connector 384 according to one embodiment of the invention. Jumper 384 includes a spring metal layer 394 and a dielectric layer 395 applied onto the spring metal layer. The dielectric layer 395, in one embodiment, is a polyimide. A conductive layer 385 formed from copper or another suitable conductive material extends along the dielectric layer 395. Conductive layer 385 has a pair of termination pads 386 joined together by a conductive trace 387. The termination pads 386 are positioned so that when the jumper connector 384 is bent along axis 396 and formed into a U-shape, the termination pads 386 are positioned to engage the termination pads 354 and 360 of flexure 310 and provide electrical communication between the termination pads. The jumper connector 394 includes an aperture 391 formed into spring metal layer 394 and the dielectric layer 395 to provide access to termination pad 386. Thus, external circuitry can be attached directly to the termination pad 386 such as by solder ball bonding when the jumper connector 384 is attached to the flexure 310. The jumper connector 384 can be attached to the flexure 310 by a press fit. Alternatively, the jumper connector 384 can be attached to the termination pads 354 and 360 by using a conductive adhesive material such as a solder paste, which is subsequently reflowed to provide a secure bond between the jumper connector 384 and the flexure 310. Although only one jumper connector 384 is shown, multiple jumper connectors may be used as needed.

Figure 22:
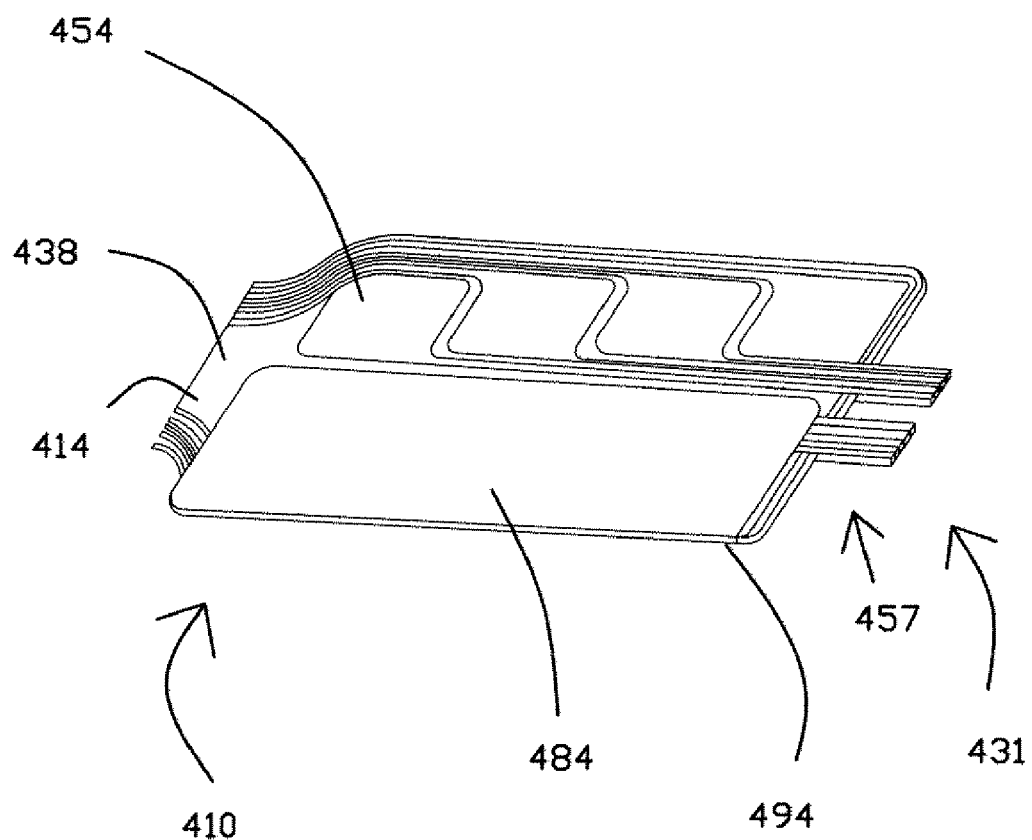
FIG. 22 is a perspective view of a portion of the tail region of a flexure showing a U-shaped jumper connector according to another embodiment of the invention.
Figure 23:
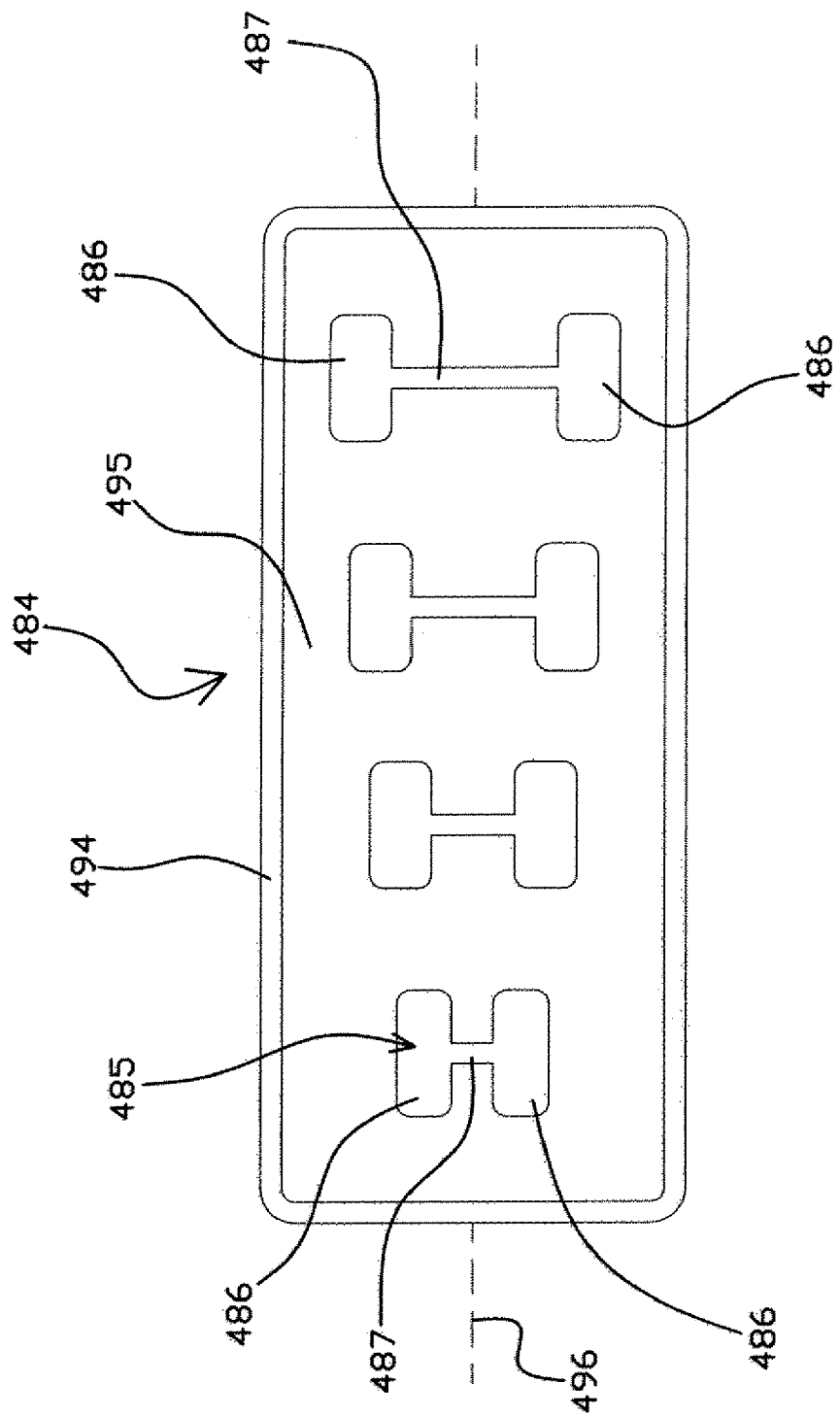
FIG. 23 is a flat pattern view showing a major surface of the U-shaped jumper connector of FIG. 22.

FIGS. 22-23 illustrates a U-shaped jumper connector 484 capable of being attached to a tail section 438 of a flexure 410 according to another embodiment of the invention. Jumper connector 484 provides electrical communication between a plurality of terminal pads 454 on a first major surface 414 and terminal pads on a second major surface (not shown). Jumper connector 484 includes a spring metal layer 494 and a dielectric layer 495 formed from a material such as a polyimide applied onto the spring metal layer. A conductive layer 485 formed from copper or another suitable conductive material extends along the dielectric layer 495. Conductive layer 485 has multiple pairs of termination pads 486 joined together by conductive traces 487. The termination pads 486 are positioned so that when the jumper connector 484 is bent along axis 496 and formed into a U-shape, the termination pads 486 are positioned to engage the termination pads on each of the major surfaces of flexure 410 and provide electrical communication between the termination pads. Thus, conductive leads 457, which extend toward a proximal end 431 of flexure 410 provide connection locations for each of the conductive leads on either of the major surfaces 414 and 416. While jumper connector 484 does not include apertures to provide external access to termination pads 486 (such as apertures 391 of jumper 384 described above), one or more such apertures may be provided in jumper connector 484 without departing from the scope of the invention.

The embodiments of the invention described above provide several important advantages. For example, placing conductive leads on both sides of the flexure allows for a reduced width of the flexure elements, especially in the gimbal region of the flexure, which, given the ever increasing need to reduce the size of suspension components, is an important advantage. In addition, considering that the overall width of the flexure is an important consideration, the current invention provides a way to supply additional conductive leads into the gimbal region for added features without increasing the width of the gimbal, which would otherwise be necessary.

Further, it has been found that positioning conductive leads on opposing surfaces of the flexure, especially in the gimbal flying lead region, provides a balanced flexure that improves the hygrothermal characteristics of the flexure. That is, changes in humidity or temperature may introduce stresses into conductive leads in the gimbal flying lead region due to the different characteristics of the polyimide and conductive lead materials. The resultant stresses may cause variations in the pitch static attitude of the flexure. With conductive leads placed on either side of the polyimide layer in the gimbal flying lead region, the stresses introduced into one conductive lead is balanced out by the stresses on the conductive lead on the opposite surface, thereby reducing variations in pitch static attitude of the flexure despite variation of temperature and humidity.

Although the present invention has been described with reference to preferred embodiments, those skilled in the art will recognize that changes can be made in form and detail without departing from the spirit and scope of the invention.

What is claimed is:

1. A flexure of the type having a mounting region and a gimbal region, for attachment to a load beam in an integrated lead disk drive suspension assembly, including:
   a spring metal layer having a first surface and a second surface opposing the first surface;
   a first layer of dielectric material on at least portions of the first surface of the spring metal layer;
   a second layer of dielectric material on at least portions of the second surface of the spring metal layer;
   a first group of a plurality of conductive leads on at least a portion of the first dielectric layer on the mounting region and gimbal region of the flexure; and a second group of one or more conductive leads on at least a portion of the second dielectric layer on the gimbal region of the flexure, and wherein the mounting region of the flexure is free of conductive leads on the second surface of the spring metal layer; and a conductive interconnection between one or more conductive leads of the second group of conductive leads and conductive leads of the first group of conductive leads.

2. The flexure of claim 1, wherein the spring metal layer of the flexure includes an aperture extending through the spring metal layer from the first surface to the second surface and the conductive interconnection extends through the aperture.

3. The flexure of claim 2, further comprising a layer of dielectric material extending through the aperture between the spring metal layer and the conductive interconnection to electrically isolate the conductive interconnection from the spring metal layer.

4. The flexure of claim 3, wherein the dielectric material extending through the aperture is attached to the first and second layers of dielectric material.

5. The flexure of claim 1, wherein:
the gimbal region of the flexure includes a slider mounting region having terminal pads; and
at least one conductive lead from the first group of conductive leads and at least one conductive lead from the second group of conductive leads are electrically connected to the terminal pads on the slider mounting region.

6. The flexure of claim 1, wherein the flexure is attached to a load beam having a channel extending along a major surface of the load beam and wherein at least of a portion of the first group of conductive leads is positioned within the channel.

7. The flexure of claim 1, further comprising a conductive layer of material positioned between the spring metal layer and at least portions of one or both of the first layer of dielectric material and the second layer of dielectric material, wherein the conductive layer of material is in electrical communication the spring metal layer.

8. An integrated lead disk drive suspension assembly comprising:
a load beam having a major surface; and
a flexure, attached to the load beam along the major surface, with a gimbal region having a slider mounting region for receiving a magnetic head and a mounting region, including:
a spring metal layer having a first surface and a second surface opposing the first surface;
a first patterned layer of dielectric material on the first surface of the spring metal layer;
a second patterned layer of dielectric material on the second surface of the spring metal layer;
a plurality of conductive leads extending from a proximal end of the flexure on the first patterned dielectric layer on the mounting region, wherein the second surface of the spring metal layer is free from conductive leads on the mounting region where the flexure is attached to the load beam;
a plurality of conductive leads extending toward a distal end of flexure on the second patterned dielectric layer and on the first patterned dielectric layer on the gimbal region; and
a conductive interconnection between conductive leads on the second dielectric layer and one or more conductive leads on the first dielectric layer.

9. The assembly of claim 8, wherein the spring metal layer of the flexure includes an aperture extending from the first surface to the second surface and the conductive interconnection extends through the aperture.

10. The assembly of claim 9, wherein the conductive interconnection is electrically isolated from the spring metal layer.

11. The assembly of claim 8, wherein the load beam includes a channel in the major surface and wherein at least one conductive lead is positioned in the channel.

12. The assembly of claim 8, wherein at least one conductive lead from each of the first and second surfaces of the flexure is electrically connected to terminal pads adjacent to the slider mounting region.

13. The assembly of claim 8, wherein at least one conductive lead from each of the first and second surfaces of the flexure includes a terminal pad for electrical connection to external conductive leads at a proximal end of the flexure.

14. The assembly of claim 13, further comprising a connector for attaching conductive leads from a second surface of the flexure to external conductive leads positioned adjacent to the first surface of the flexure.

15. The assembly of claim 8, further comprising:
a first microactuator attached to the first surface of the flexure and electrically connected to at least one conductive lead on the first patterned layer; and
a second microactuator attached to the second surface of the flexure and electrically connected to at least one conductive lead on the second patterned layer.

* * * * *